(12) United States Patent
Saito et al.

(10) Patent No.: US 7,529,935 B2
(45) Date of Patent: May 5, 2009

(54) INFORMATION COMMUNICATION DEVICE, INFORMATION COMMUNICATION SYSTEM, AND COMPUTER PROGRAM PRODUCT FOR TRANSMISSION CONTROL

(75) Inventors: Takeshi Saito, Meguro-ku (JP); Hiroshi Isozaki, Kawasaki (JP); Tatsuyuki Matsushita, Kawasaki (JP); Taku Kato, Fuchuu (JP); Tooru Kamibayashi, Chigasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 830 days.

(21) Appl. No.: 10/876,705

(22) Filed: Jun. 28, 2004

(65) Prior Publication Data

US 2005/0027984 A1 Feb. 3, 2005

(30) Foreign Application Priority Data

Jul. 9, 2003 (JP) .......................... P2003-194491
Dec. 4, 2003 (JP) .......................... P2003-406359

(51) Int. Cl.
H04L 9/00 (2006.01)

(52) U.S. Cl. ...................... 713/168; 713/176; 380/201; 380/229; 380/248

(58) Field of Classification Search ................ 380/201, 380/202, 229, 232, 247, 248, 249, 250, 258; 713/168, 161, 169, 170, 171, 176; 705/57, 705/58

See application file for complete search history.

(56) References Cited

U.S. PATENT DOCUMENTS

2005/0027984 A1 2/2005 Saito et al.

FOREIGN PATENT DOCUMENTS

EP 1 182 825 A2 2/2002

(Continued)

OTHER PUBLICATIONS

U.S. Appl. No. 10/599,958, filed Oct. 16, 2006, Saito, et al.

(Continued)

*Primary Examiner*—Kimyen Vu
*Assistant Examiner*—Baotran N To
(74) *Attorney, Agent, or Firm*—Oblon, Spivak, McClelland, Maier & Neustadt, P.C.

(57) ABSTRACT

An aspect of the present invention provides an information communication device for transmitting electronic data encrypted for the purpose of copyright protection, the device includes that an identification information managing unit configured to hold device identification information in connection with other information communication devices acquired through a network, an ID registration processing unit configured to register the device identification information of another connection device when the other communication device satisfies a predetermined distance condition or when common identification information that is held by both information communication devices is received from a portable device, and an authentication and key exchange processing unit configured to, for the purpose of copyright protection, complete authentication and key exchange process (AKE process) only when another information communication device whose device identification information is registered in the identification information managing unit.

25 Claims, 23 Drawing Sheets

FOREIGN PATENT DOCUMENTS

| | | | |
|---|---|---|---|
| EP | 1 235 389 A1 | | 8/2002 |
| EP | 1 571 804 A2 | | 9/2005 |
| JP | 2001-285284 | * | 10/2001 |
| JP | 2002-300162 | | 10/2002 |
| JP | 2003-37604 | * | 2/2003 |
| JP | 2003-037604 | | 2/2003 |
| JP | 2003-179773 | * | 6/2003 |

OTHER PUBLICATIONS

U.S. Appl. No. 10/876,705, filed Jun. 28, 2004, Saito, et al.
U.S. Appl. No. 10/984,989, filed Nov. 10, 2004, Isozaki, et al.
"5C Digital Transmission Content Protection White Paper", Hitachi, Intel, Matsushita Electric Industrial, Sony, Toshiba, XP-002304290, Jul. 14, 1998, pp. 1-13.
James Kardach, "Bluetooth Architecture Overview", Intel Technology Journal Q2, XP-002304291, May 5, 2000, pp. 1-7.
U.S. Appl. No. 11/019,349, filed Dec. 23, 2004, Matsushita et al.
U.S. Appl. No. 11/034,845, filed Jan. 14, 2005, Isozaki et al.
U.S. Appl. No. 11/071,252, filed Mar. 4, 2005, Isozaki et al.
U.S. Appl. No. 11/130,135, filed May 17, 2005, Isozaki et al.
U.S. Appl. No. 10/352,128, filed Jan. 28, 2003, Saito et al.
U.S. Appl. No. 10/615,768, filed Jul. 10, 2003, Nakakita et al.
U.S. Appl. No. 10/722,515, filed Nov. 28, 2003, Saito et al.
U.S. Appl. No. 10/729,964, filed Dec. 9, 2003, Isozaki et al.
U.S. Appl. No. 10/876,705, filed Jun. 28, 2004, Saito et al.
"SmartRight, Contribution to Rights Management and Protection Specifications", Thomson Multimedia, Technical White Paper, XP-002310904, May 22, 2002, 29 pages.
S. A. F. A. Van Den Heuvel, et al., "Secure Content Management in Authorised Domains", International Broadcasting Convention, XP-002273504, Sep. 15, 2002, pp. 467-474.

* cited by examiner

FIG.3  DEVICE ID LIST OF ID MANAGEMENT UNIT

| MANDATORY ITEMS | | OPTIONAL ITEMS | | |
|---|---|---|---|---|
| | | RIT | UNIQUE ID | TIME OF LAST USE |
| COUNTERPART DEVICE 1 DEVICE ID | AA | ○○ms | XXX | △MONTH ×DAY ○HOUR ×MINUTE |
| COUNTERPART DEVICE 2 DEVICE ID | AA | △△ms | YYY | ×MONTH □DAY △HOUR ○MINUTE |
| COUNTERPART DEVICE 3 DEVICE ID | BB | ××ms | ZZZ | △MONTH ×DAY ○HOUR □MINUTE |

FIG.12

SHORT-DISTANCE ID LIST OF SHORT-DISTANCE ID MANAGING UNIT

| MANDATORY ITEMS | OPTIONAL ITEMS | | |
|---|---|---|---|
| | RIT | DCPT DEVICE ID | TIME OF REGISTRATION |
| (1) SHORT-DISTANCE ID = AA | ○○ms | XXX | △MONTH ×DAY ○HOUR ×MINUTE |
| (2) SHORT-DISTANCE ID = BB | △△ms | YYY | ×MONTH □DAY △HOUR ○MINUTE |
| (3) SHORT-DISTANCE ID = CC | ××ms | ZZZ | △MONTH ×DAY ○HOUR □MINUTE |

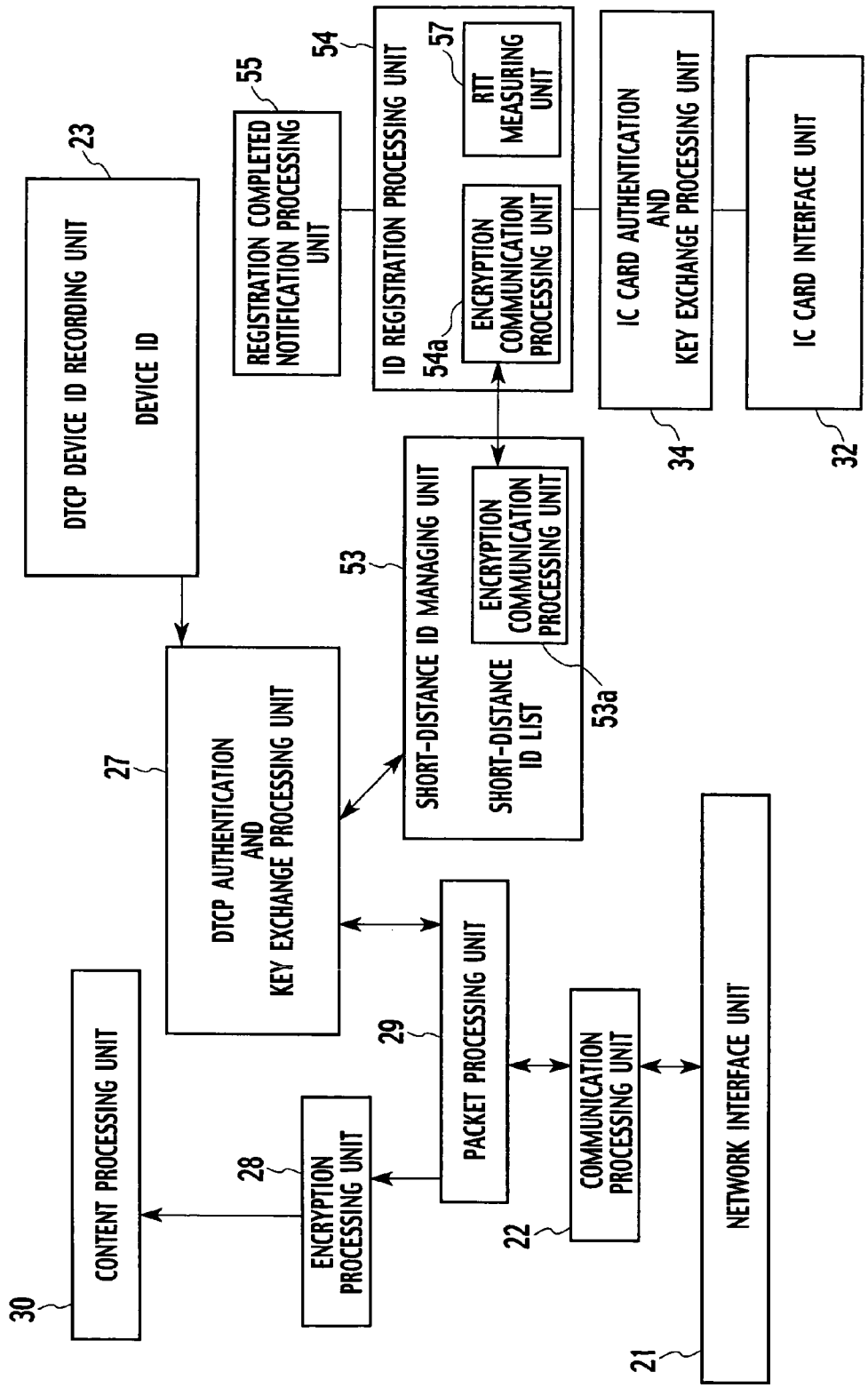

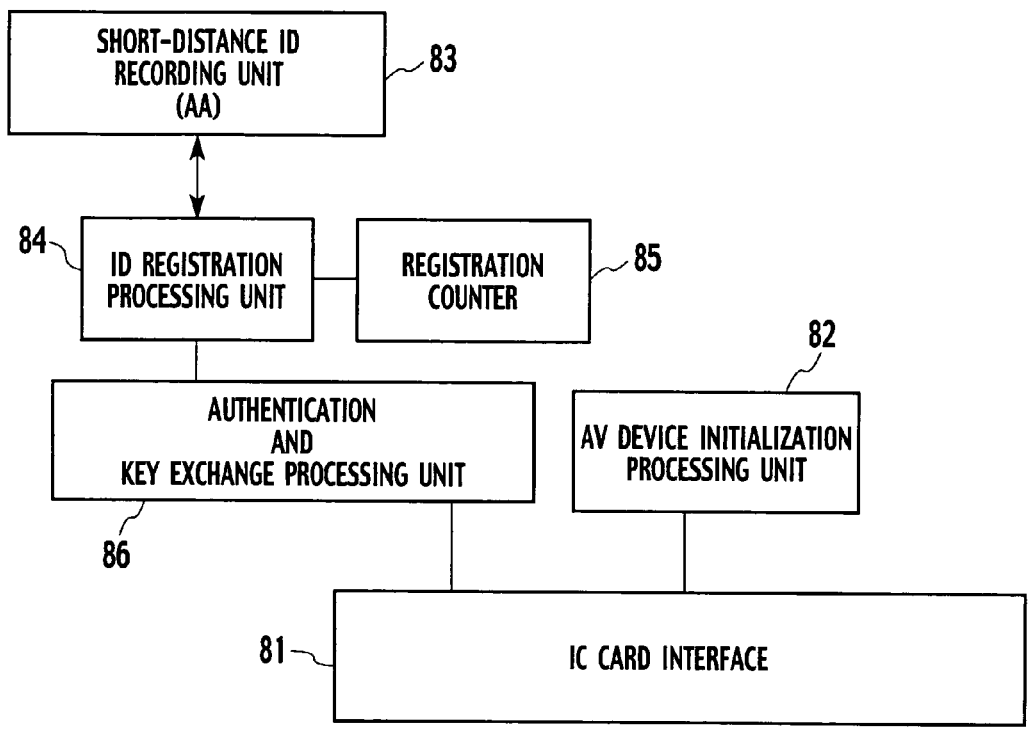
FIG.23  INTERNAL FEATURES OF IC CARD
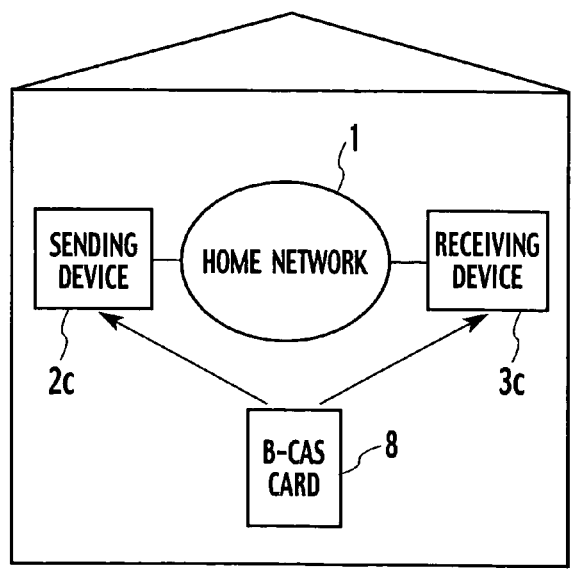
FIG.24

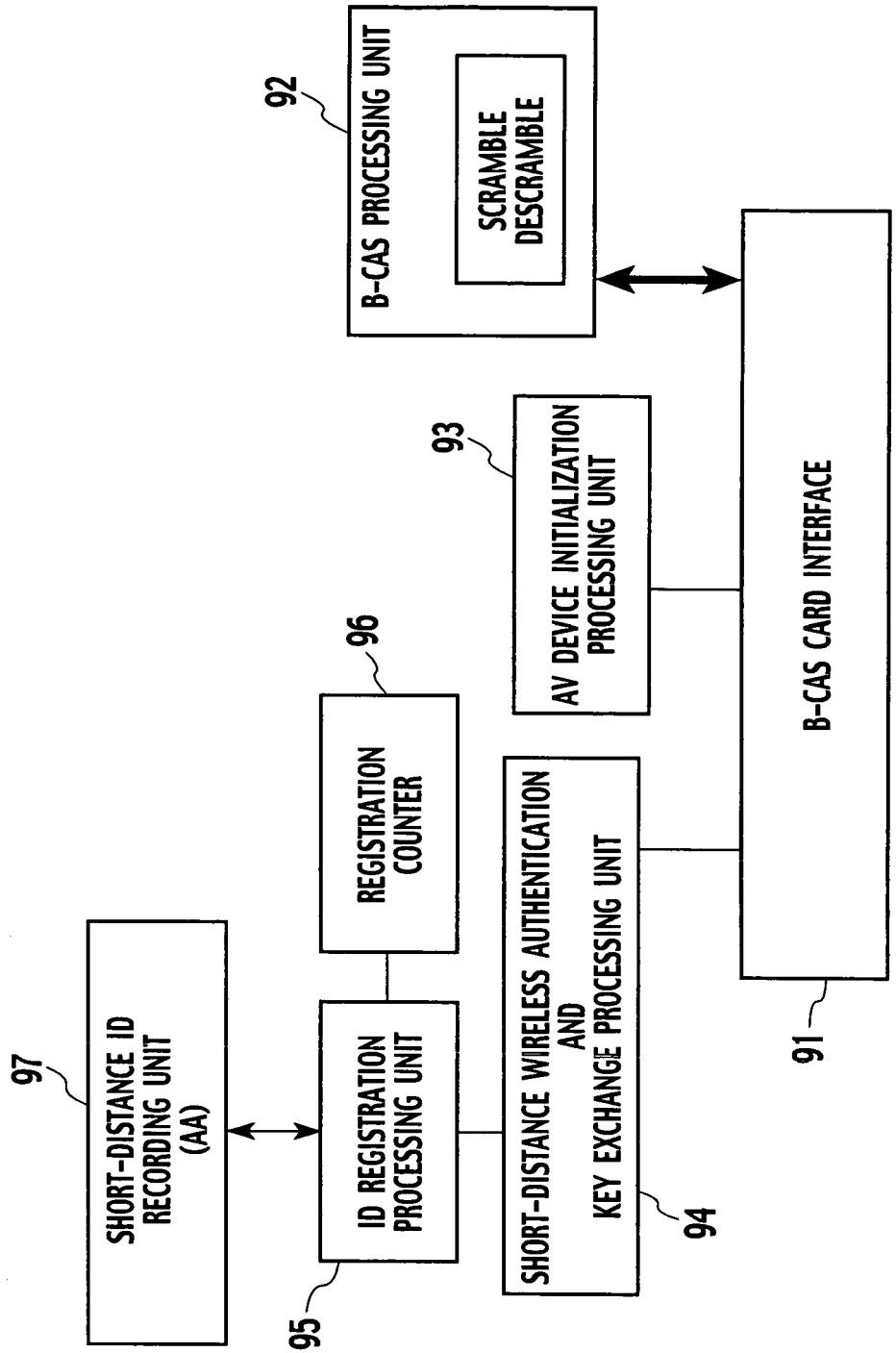

INFORMATION COMMUNICATION DEVICE, INFORMATION COMMUNICATION SYSTEM, AND COMPUTER PROGRAM PRODUCT FOR TRANSMISSION CONTROL

CROSS REFERENCE TO RELATED APPLICATIONS

This application claims benefit of priority under 35 USC 119 based on Japanese Patent Applications No. P2003-194491 filed on Jul. 9, 2003, and No. P2003-406359 filed on Dec. 4, 2003, the entire contents of which are incorporated by reference herein.

BACKGROUND OF THE INVENTION

1. Field of the Invention

The present invention relates to an information communication device, information communication system, and transmission control program for sending and receiving electronic data that requires copyright protection between a sending device and a receiving device.

2. Description of Related Art

The number of so-called digital information electric products is increasing and the popularity of these products is expected to spread with start of digital broadcasting. These products include such items as televisions compatible with digital broadcasting, digital VTRs, DVD players, hard disk recorders, and various other products that handle digital data and digital content.

One of the problems that must be addressed as these products became more widespread is the issue of copyright protection for the content. While digital data is advantageous in that it can be copied without degrading in quality, it has the disadvantage of being easy to copy illicitly.

Consequently, systems compliant with IEEE 1394, i.e., digital networks that connect digital AV (audiovisual) devices together, are provided with functions for authentication, key exchange, and data encryption.

Consider a hypothetical situation in which AV data requiring copyright protection is to be transmitted form a sending device to a receiving device. In such a situation, it is important for the copyright protection to be contrived in such a manner that an individual (or, in a broader interpretation, a family) can enjoy handling the AV data without being hindered by the copyright protection so long as the handling does not involve exchanging the AV data with other parties or the payment of listening/viewing fees or copyright royalties.

DTCP (digital transmission content protection) is a known system for providing copyright protection on networks. DTCP has become a de facto standard copyright protection method for use with IEEE 1394 and USB. With DTCP, authentication and key exchange processing is executed between the sending device and the receiving device with respect to the AV data or other content requiring copyright protection and the AV data is transmitted in an encrypted manner (see http://www.dtcp.com).

Generally, copyright protection in a transmission system involves transmitting AV data using the following processing steps. First, commands for sending and receiving AV data are issued between the sending device and the receiving device. For example, the receiving device issues the playback and (which is one of the AV control commands) to the sending device.

Next, the AV data is encrypted for copyright protection and transmission of the AV data from the sending device to the receiving device commences. Before or after the transmission, authentication and key exchange processing for the copyright protection is executed between the sending device and the receiving device. If the authentication and key exchange processing is successful, it becomes possible for the AV data encryption key to be shared by the sending device and the receiving device or for the sending device and receiving device to calculate an encryption key and the receiving device decrypts and plays back the received encrypted AV data. If the AV data transmission is conducted using an internet protocol (IP), various web applications can be linked and web browsers and other assets can be utilized so that various network configurations can be accommodated.

For this reason, an IP (more specifically, IPv4 or IPv6) is often used as the protocol for transmitting AV data that has been compressed using MPEG or the like. Still more specifically, such protocols as RTP (real time transport protocol) and HTTP (hypertext transport protocol) are used.

However, with an IP, a security problem arises because IP packets can be transmitted regardless of the specific network configuration. Consequently, there are IP technologies, such as VPN (virtual private network), for connecting remote IP networks together logically. When one of these technologies is used, IP packets can be transmitted between a home network of a person X in a district A and a home network of a person Y in a district B (which is physically distant from the district A) over the VPN or the like. In other words, the home network of the person X and the home network of the person Y can be operated as though they are a single home network.

Regarding copyright protection, copying and the like of AV data are allowed within the realm of individual enjoyment but other parties are not allowed to copy the AV data. However, by using one of the technologies just mentioned (e.g., VPN technology), it is possible to make the networks of different individuals appear logically as a single network (that is, it is possible to configure the networks as a single network) and there is the possibility that devices that violate copyright laws will became available.

SUMMARY OF THE INVENTION

An aspect of the present invention provides an information communication device for transmitting electronic data encrypted for the purpose of copyright protection, the device includes that an identification information managing unit configured to hold device identification information in connection with other information communication devices acquired through a network, an ID registration processing unit configured to register the device identification information of another communication device when the other communication device satisfies a predetermined distance condition or when common identification information that is held by both information communication devices is received from a portable device, and an authentication and key exchange processing unit configured to, for the purpose of copyright protection, complete authentication and key exchange process (AKE process) only when another information communication device whose device identification information is registered in the identification information managing unit.

Another aspect of the present invention provides an information communication system for transmitting electronic data encrypted for the purpose of copyright protection, the system includes that a sending device, and a receiving device configured to receive electronic data encrypted for the purpose of copyright protection and sent from the sending device, wherein at least one of the sending device and the receiving device includes that an identification information managing unit configured to hold device identification information regarding another device acquired through a network, an ID registration processing unit configured to register the device identification information of another device when the other device is recognized to be connected to a network having a prescribed limited range, and an authentication and key exchange processing unit configured to complete AKE process only when another information communication device whose device identification information is registered in the identification information managing unit.

Furthermore, another aspect of the present invention provides a computer program product comprising a computer useable medium having computer program logic recorded thereon for enabling a processor to control transmission of electronic data encrypted for the purpose of copyright protection, the computer program product includes that a sending procedure that enables the processor to send a request packet to another information communication device with which communication is to be conducted, a receiving procedure that enables the processor to receive a response packet from another information communication device, a determining procedure that enables the processor to determine if another information communication device is connected to a network having a prescribed limited range based on the received device ID response packet, a registration procedure that enables the processor to register the device identification information of another information communication device when it is determined that the other information communication device is connected to a network having a prescribed limited range, and an authentication and key exchange procedure that enables the processor to, for the purpose of copyright protection, complete AKE process only when another information communication device whose device identification information is registered in the identification information managing unit.

BRIEF DESCRIPTION OF THE DRAWINGS

FIG. 3 shows an example of an ID list.

FIG. 11 is a block diagram showing an example of the receiving device 3a.

FIG. 12 shows the data structure of the short-distance ID managing units 43, 53 inside the sending device 2a and receiving device 3a.

FIG. 15 is a sequence diagram showing the processing steps for registering a short-distance ID to the sending device 2a and the receiving device 3a.

FIG. 17 is a sequence diagram showing the processing steps for transmitting AV data between the sending device 2a and the receiving device 3a.

FIG. 18 is a sequence diagram showing the processing steps for a case in which the short-distance ID (=AA) sent from the receiving device 3a in the previously described step S91 is not registered in the short-distance ID managing unit 43 of the sending device 2a.

FIG. 19 is a sequence diagram showing another example of the processing steps for transmitting AV data between the sending device 2a and the receiving device 3a.

FIG. 22 is a block diagram showing an example of the internal features of the receiving device 3b shown in FIG. 20.

FIG. 23 is a block diagram showing an example of the internal features of an IC card.

FIG. 24 is a block diagram showing an information communication system in accordance with the fifth embodiment of the present invention.

FIG. 26 is a block diagram showing an example of the internal features of a B-CAS card 6.

DETAILED DESCRIPTION OF THE EMBODIMENTS

Figure 1:
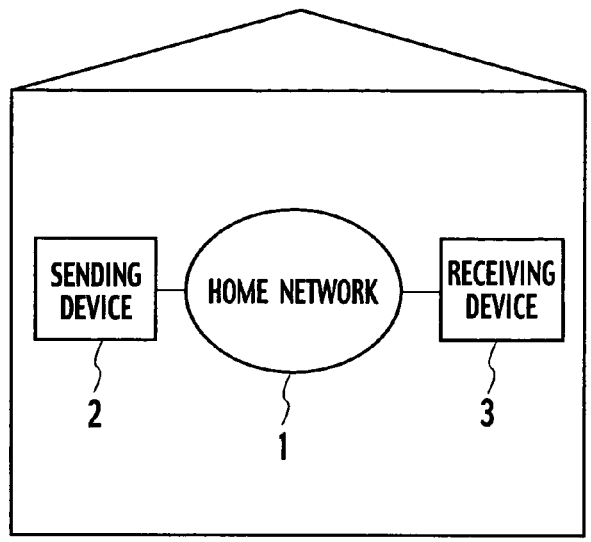
FIG. 1 is a block diagram showing a receiving device according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIG. 1 is a block diagram of an information communication system in accordance with a first embodiment of the present invention. The information communication system shown in FIG. 1 is intended for sending and receiving chiefly AV data within the residence of an individual and is provided with a sending device 2 and a receiving device 3 connected to a home network 1.

The home network 1 can be any of a variety of network configurations, such as a wireless LAN compliant with IEEE 802.11, an Ethernet (registered trademark), or an IEEE 1394 network. It is acceptable for other devices to be connected to the home network 1 in addition to the sending device 2 and the receiving device 3, but such devices are omitted here for the purpose of simplification. When an internet protocol (IP) is used on the home network 1, either IPv4 or IPv6 is acceptable.

The AV data exchanged between the sending device 2 and receiving device 3 requires copyright protection and is transmitted in a state in which appropriate copyright protection has been applied. In this embodiment, it will be assumed that DTCP is used as the method of achieving copyright protection on the network, but it also acceptable to use a copyright protection arrangement other than DTCP. See http://www.dtcp.com for more information regarding DTCP.

In this embodiment, a registration procedure is established in advance between the sending device 2 and the receiving device 3 whereby the sending device 2 and receiving device 3 are both registered to each other or only one is registered to the other. Devices that have not completed the registration procedure are not allowed to transmit AV data to each other, decrypt encrypted AV data, or complete the authentication and key exchange processing.

More specifically, the transmission time is generally longer when packets are transmitted between different home networks 1 and a router network (public internet) is typically used when different home networks 1 are connected together. In this embodiment, the information communication device takes advantage of these characteristics and ends the registration if the exchange of the registration packets is not completed within a prescribed amount of time. The packets used for registration can be data link layer frames and physical layer frames. These frames include, for example, Ethernet (registered trademark) packets and wireless layer packets. Since these frames are not routed by the router, the exchange of these frames can be limited to devices that can communicate within a prescribed LAN.

Figure 2:
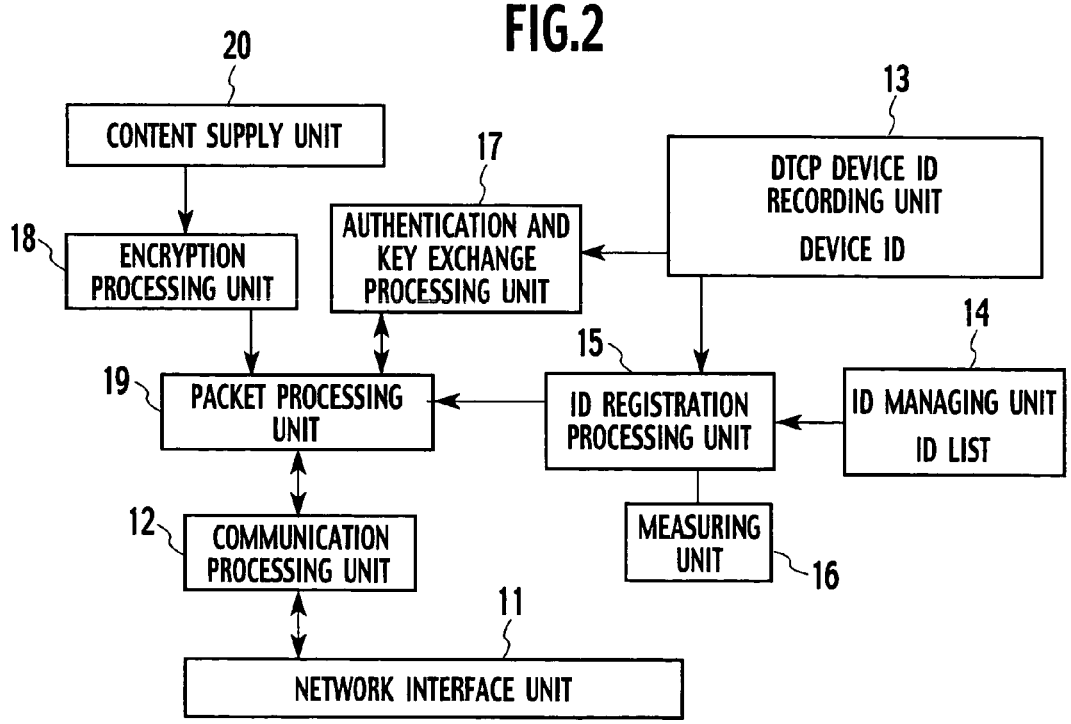
FIG. 2 is a block diagram an embodiment of the sending device 2.

FIG. 2 is a block diagram an embodiment of the sending device 2. The sending device 2 shown in FIG. 2 is provided with the following: a network interface unit 11; a communication processing unit 12 configured to execute communication processing; a DTCP device ID recording unit 13 configured to record the DTCP device ID of the sending device 2; an ID managing unit 14 configured to register the device IDs of other communication devices inside the same residence acquired through the network; an ID registration processing unit 15 configured to control the registration of device IDs in the ID management unit 14; a measuring unit 16 configured to measure the time required for the device ID's to be reported from the other communication devices; an authentication and key exchange processing unit 17 configured to execute DTCP authentication and key exchange processing in order to accomplish copyright protection, an encryption processing unit 18 configured to encrypt data that will be sent; a packet processing unit 19 configured to convert the AV data and the DTCP management data to be sent to the receiving device 3 into communication packets; and a content supply unit 20 configured to store AV data.

After the ID registration processing unit 15 requests another communication device inside the residence to send its device ID, the measuring unit 16 measures the time until there is a response providing the device ID. It is also acceptable that the measuring unit 17 measures time of other packet communications than that of device ID between the sending device 2 and the other communication device. If the response occurs within a prescribed amount of time, the ID registration processing unit 15 registers the device ID in the ID managing unit 14. The ID managing unit 14 holds a list of registered device IDs (hereinafter called the "ID list") and, when the ID registration processing unit 15 issues a request to register a device ID, the ID managing unit 14 adds the device ID to the ID list so long as the device ID has not already been registered to the ID list.

In this embodiment, the measuring device 16 measures the distance between the sending device 2 and the other communication device within the network by measuring time. However, the invention is not limited to this method and it is also acceptable to measure the physical distance using a GPS or the like. In the case of a wireless arrangement, it is also acceptable to measure the distance based on the strength of the wireless signal. When an optical communication medium is used, it is acceptable to measure the distance based on the intensity of the light.

FIG. 3 shows an example of an ID list. The ID list registers the DTCP device ID of each of the other communication devices as a mandatory item and registers such optional items as the following: the RTT (round trip time), a unique ID (e.g., MAC address), and date and time of last use (data and time of the last communication with the other communication device).

Up to N (where N is a prescribed integer) device IDs can be registered in the ID list. When there is a request to register a new device ID and N device IDs have already been registered, it is acceptable to handle the request by either denying the registration of the new device ID or deleting a previously registered device ID so that the new device ID can be registered. In the latter case, any of the following arrangements is acceptable: delete the device ID of the registered communication device with which communication has not been conducted for the longest period of time; delete the device ID that was registered the longest ago, as in the case of the FIFO format; or allow the user to delete an arbitrary device ID by means of some kind of user interface. In this way, the number of device ID entries in the ID list can be limited as mentioned above.

In this embodiment, the DTCP device ID is an identification number for the DTCP device. It is preferable that every DTCP device in the entire world have a unique ID. It is also acceptable for the DTCP device ID to be an ID embedded in a certificate (called a "device certificate") that proves the device is a properly licensed device. The device certificate includes digital signatures and the like that can be verified to confirm that the device certificate is correct.

Figure 4:
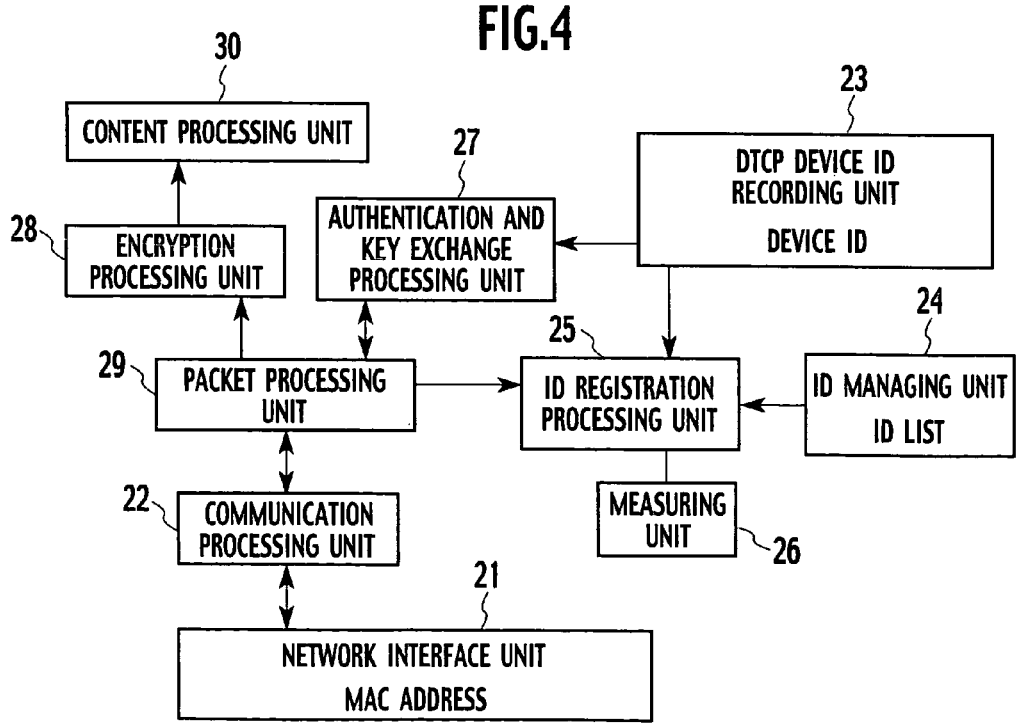
FIG. 4 is a block diagram showing the internal features of a receiving device 3 in accordance with the embodiment.

FIG. 4 is a block diagram showing the internal features of a receiving device 3 in accordance with this embodiment. The receiving device 3 shown in FIG. 4 is provided with the following: a network interface unit 21; a communication processing unit 22 configured to execute communication processing; a DTCP device ID recording unit 23 configured to record the DTCP device ID of the receiving device 3; an ID managing unit 24 configured to register the device IDs of other communication devices inside the same residence acquired through the network; an ID registration processing unit 25 configured to control the registration of device IDs in the ID management unit 24; a measuring unit 26 configured to measure the time required for the device ID's to be reported form the other communication devices; an authentication and key exchange processing unit 27 configured to execute DTCP authentication and key exchange processing in order to accomplish copyright protection, an encryption processing unit 28 configured to decrypt data that has been received; a packet processing unit 29 configured to convert the received signal into AV data; and a content supply unit 30 configured to store AV data.

Figure 5:
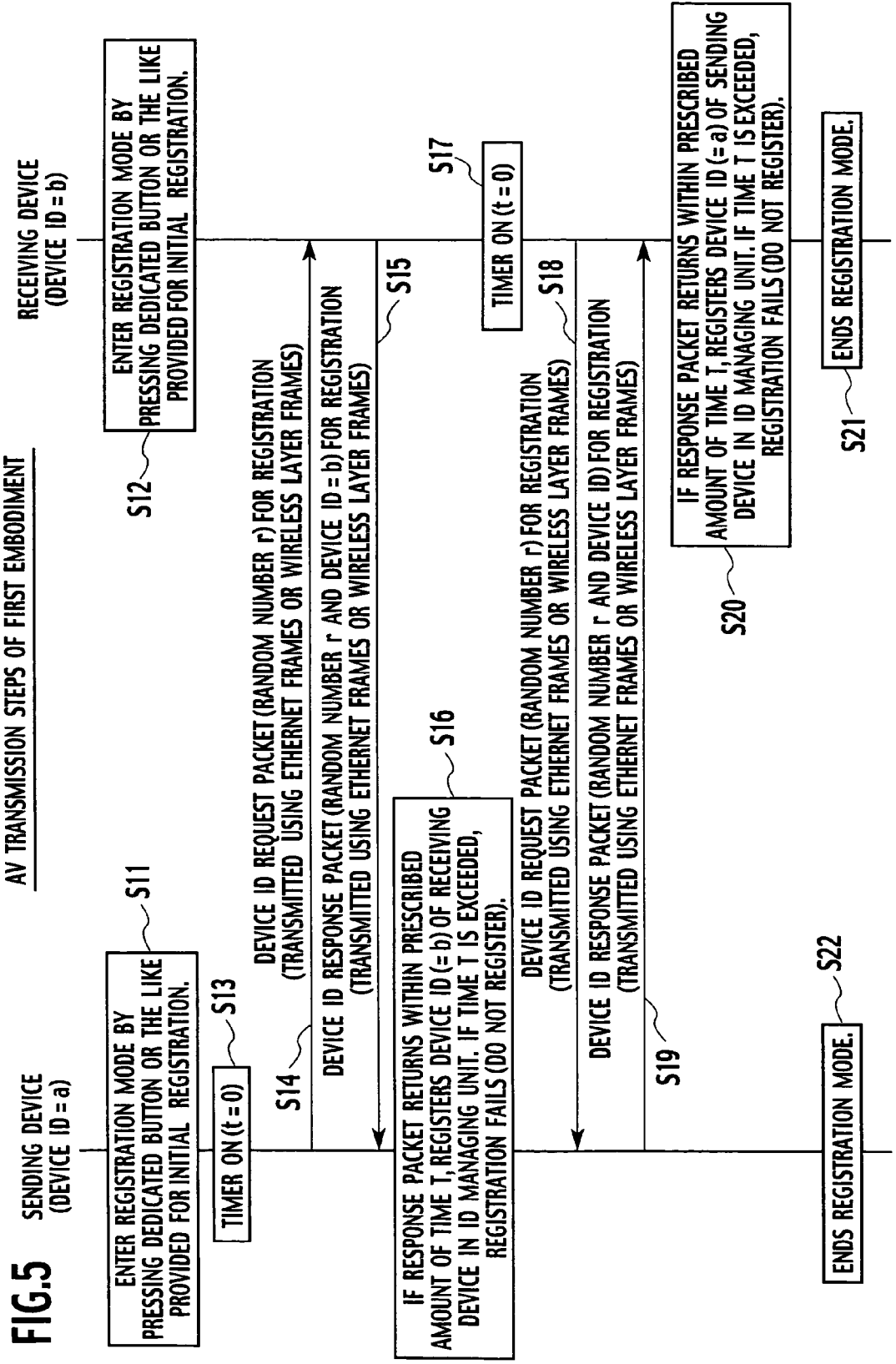
FIGS. 5 and 6 are sequence diagrams showing the processing steps for transmitting AV data between the sending device 2 and the receiving device 3 in accordance with the first embodiment.
Figure 6:
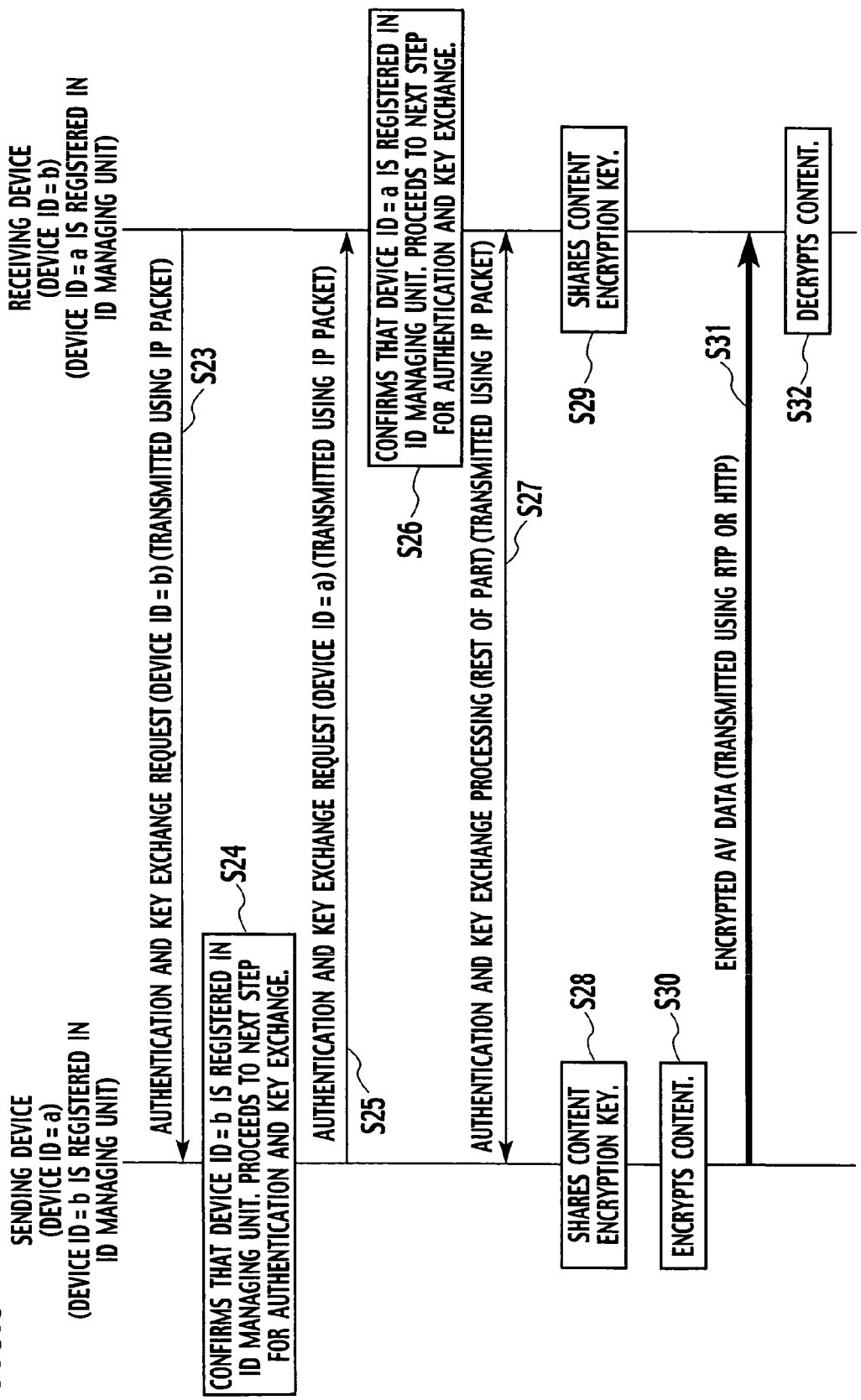

FIGS. 5 and 6 are sequence diagrams showing the processing steps for transmitting AV data between the sending device 2 and the receiving device 3 in the first embodiment. The sequence diagrams shown in FIGS. 5 and 6 start when the users of the sending device 2 and the receiving device 3 press a register button or click a register icon (steps S11 and S12).

It is also acceptable to start the processing of FIG. 5 when a starting action is performed at only one or the other of the sending device 2 and the receiving device 3. Still another option is to set the sending device 2 and the receiving device 3 to registration mode and start the processing of FIG. 5 automatically when the power to said devices is turned on.

In any case, registration processing is executed between two devices each of whose registration button was pressed or between a communication device whose registration button was pressed and another communication device (normally a communication device whose power is on).

It is also acceptable to configure the system such that registration processing starts without obtaining an instruction to start registration form a user.

Although FIG. 5 illustrates a case in which registration is performed between two devices, i.e., the sending device 2 and the receiving device 3, it is also acceptable register three or more devices simultaneously.

When the registration processing starts, the sending device 2 starts measuring time (timer ON) using the measuring unit (step S13) and sends a device ID send request packet to the receiving device 3 for the purpose of registering the device ID in the ID list (step S14). The packet can be sent using Ethernet (registered trademark) frames or wireless layer frames (data link layer frames or physical layer frames). The device ID send request packet includes a time stamp and a random number selected by the sending device 2. It is acceptable for the sending device 2 to broadcast the device ID send request packet over the network. In such a case, the Ethernet (registered trademark) broadcast address is used as the destination Ethernet (registered trademark) address.

The receiving device 3 receives the device ID send request packet and sends a device ID response packet to the sending device 2 (step S15). The device ID response packet, too, is sent using Ethernet (registered trademark) frames or wireless layer frames. It is acceptable for the receiving device 3 to include in the device ID response packet the same random number and time stamp as was included in the device ID send request packet from the sending device 2. In this way, the sending device 2 can know which request packet the response corresponds to and it is easier for the measuring unit 16 to measure the time.

It is also acceptable to configure the system such that the receiving device 3 sends a device ID send request packet to the sending device 2 and, after receiving the packet, the sending device 2 sends a device ID response packet to the receiving device 3. In this case, the time required for the packet response is measured by the receiving device 3. In case that the receiving device 3 measures the packet response, it is acceptable that the receiving device 3 sends a result of the measured time of the packet response to the sending device 2.

If the device ID response packet is received within a prescribed amount of time T, the ID registration processing unit 15 inside the sending device 2 registers the device ID of the receiving device 3 in the ID managing unit 24. If the device ID response packet is not received within the prescribed amount of time T, the registration is determined to have failed and the device ID is not registered in the ID managing unit 24 (step S16).

It is acceptable that the time measurement is conducted only once, and it is also acceptable that the time is measurement is retried for prescribed times until the device ID response packet is received within a prescribed amount of time.

If the device ID registration fails, it is necessary to inform the user that it is necessary to perform the device ID registration over an identical link network but with a shorter distance between devices. Therefore the user is urged to try such actions as the following: perform the registration with the sending device 2 and the receiving device 3 plugged into the same Ethernet (registered trademark) switch; perform the registration with the sending device 2 and the receiving device 3 connected directly to the Ethernet (registered trademark) cable; temporarily reduce the traffic on the network (by, for example, stopping transmissions of AV data between other communication devices); stop other applications running on the sending device 2 or receiving device 3 in order to reduce the processing load.

After the processing of step S16 is completed, the receiving device 3 starts measuring time with the measuring unit 26 (step S17) and sends a device ID send request packet to the sending device 2 (step S18). The sending device 2 receives the request and sends a device ID response packet (step S19).

If the receiving device 3 receives the device ID response packet from the sending device 2 within a prescribed amount of time T, the receiving device 3 registers the device ID of the sending device 2 in the ID managing unit. If the device ID response packet is not received within the prescribed amount of time T, the device ID of the sending device 2 is not registered (step S20).

It is acceptable that the time measurement is conducted only once, and it is also acceptable that the time measurement is retried for prescribed times until the device ID response packet is received within a prescribed amount of time.

It is also acceptable to accomplish this time measurement using packets other than the device ID registration request and response packets. It is also acceptable to accomplish the time measurement using IP packets. But not limited to this, other packets can be used in this embodiment.

After completing the procedure just described, the sending device 2 and the receiving device 3 end registration mode (steps S21 and S22) and execute authentication and key exchange processing (steps S23 to S29 of FIG. 6).

First, the receiving device 3 uses an IP packet to send a request for authentication and key exchange to the sending device 2 (step S23). The receiving device 3 includes its own device ID in the IP packet.

The sending device 2 receives the IP packet from the receiving device 3 and checks if the device ID of the receiving device 3 is registered in the ID managing unit 14 (step S24). If the device ID is registered, the sending device 2 uses an IP packet to send a request for authentication and key exchange to the receiving device 3 (step S25). The sending device 2 includes its own device ID in the IP packet. For example, the measurement can be achieved using key exchange or random number request and response packets. Another example is that the measurement can be done using Ethernet Frames instead of IP packets.

The receiving device 3 receives the IP packet from the sending device 2 and checks if the device ID of the sending device 2 is registered in the ID managing unit 24 (step S26). If the device ID is registered, authentication and key exchange is executed between the sending device 2 and the receiving device 3 (step S27).

If the authentication and key exchange succeeds, the sending device 2 and the receiving device 3 will share a content encryption key (steps S28 and S29) and the sending device will encrypt the content (step S30).

In this embodiment, the RTT measurement is carried out at the beginning part of the processing AKE (authentication and key exchange) protocol. It is also acceptable such that the RTT measurement is carried out before the processing of AKE protocol, during the processing of the AKE protocol, or at the ending part of the processing AKE protocol.

Next, the sending device 2 transmits the encrypted AV data using RTP or HTTP (step S31). The receiving device 3 receives the AV data and decrypts the content (step S32).

When either one of the devices, i.e., the sending device 2 or the receiving device 3, has already completed the device ID registration procedure, the steps S13 to S16 or the steps S17 to S20 of FIG. 5 can be omitted.

It is also acceptable to conduct the request for device ID registration and the response thereto at the authentication and key exchange processing stage of step S25.

Figure 7:
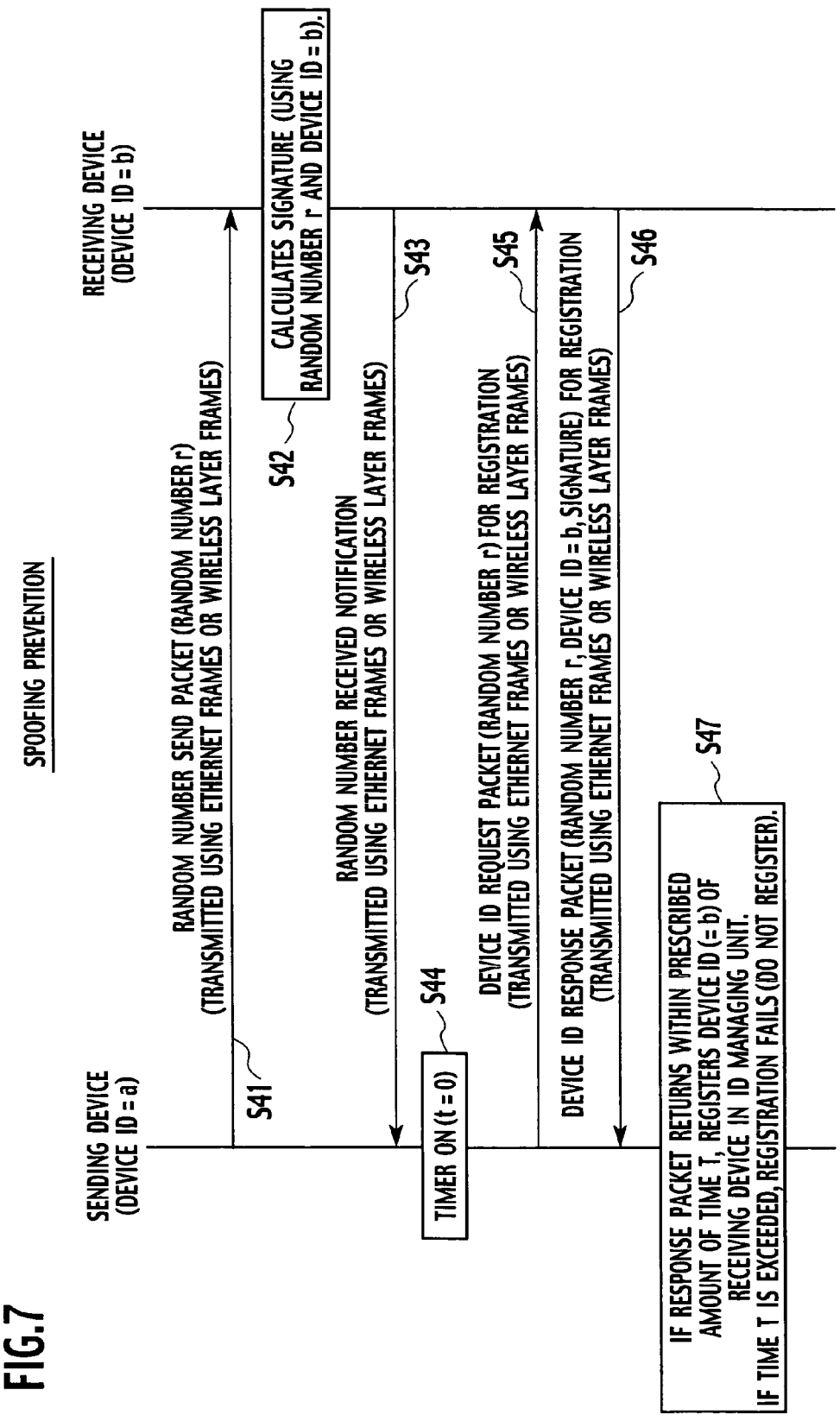
FIG. 7 is a sequence diagram showing the processing steps for spoofing prevention in accordance with the first embodiment.

It is also acceptable to provide a procedure for protecting against spoofing (man in the middle attack) when the device ID registration request and registration response are executed. In such a case, processing such as that shown in FIG. 7 is executed instead of the steps S14 to S16 of FIG. 5.

First, the sending device 2 sends a random number send packet to the receiving device 3 using Ethernet (registered trademark) frames or wireless layer frames (step S41). The random number send packet contains a random number r generated by the sending device 2.

The receiving device 3 receives the random number send packet and calculates a signature using the random number and its own device ID (step S42). The receiving device 3 sends a random number received notification to the sending device 2 using Ethernet (registered trademark) frames or wireless layer frames (step S43).

After receiving the notification, the sending device 2 starts measuring time using the measuring unit (step S44) and sends a device ID request packet to the receiving device 3 using Ethernet (registered trademark) frames or wireless layer frames (step S45). This packet contains the aforementioned random number r.

After receiving the packet, the receiving device 3 sends a device ID response packet containing the random number r and its own device ID and signature to the sending device 2 (step S46).

The sending device 2 determines if the amount of time from when it sent the device ID request packet until when it received the device ID response packet is within a prescribed amount of time T. If the time is within the prescribed amount of time T, the device ID=b of the receiving device 3 is registered in the ID managing unit. If response is not received within the prescribed amount of time T, the device ID is not registered to the ID managing unit (step S47).

Thus, in the first embodiment, the other communication device (receiving device 3 or sending device 2) is only registered if the response is received within a prescribed amount of time after the device ID registration request is issued. As a result, it is possible to restrict the transmission of AV data to communication devices that are within a limited area and the AV data can be copyright-protected using simple processing.

Second Embodiment

The second embodiment is configured such that after the receiving device 3 has issued a request for authentication and key exchange to the sending device 2, the sending device 2 sends a device ID request packet to the receiving device 3.

The constituent features of the sending device 2 and the receiving device 3 of the second embodiment are the same as those shown in FIG. 2 and FIG. 4 and descriptions thereof are therefore omitted.

Figure 8:
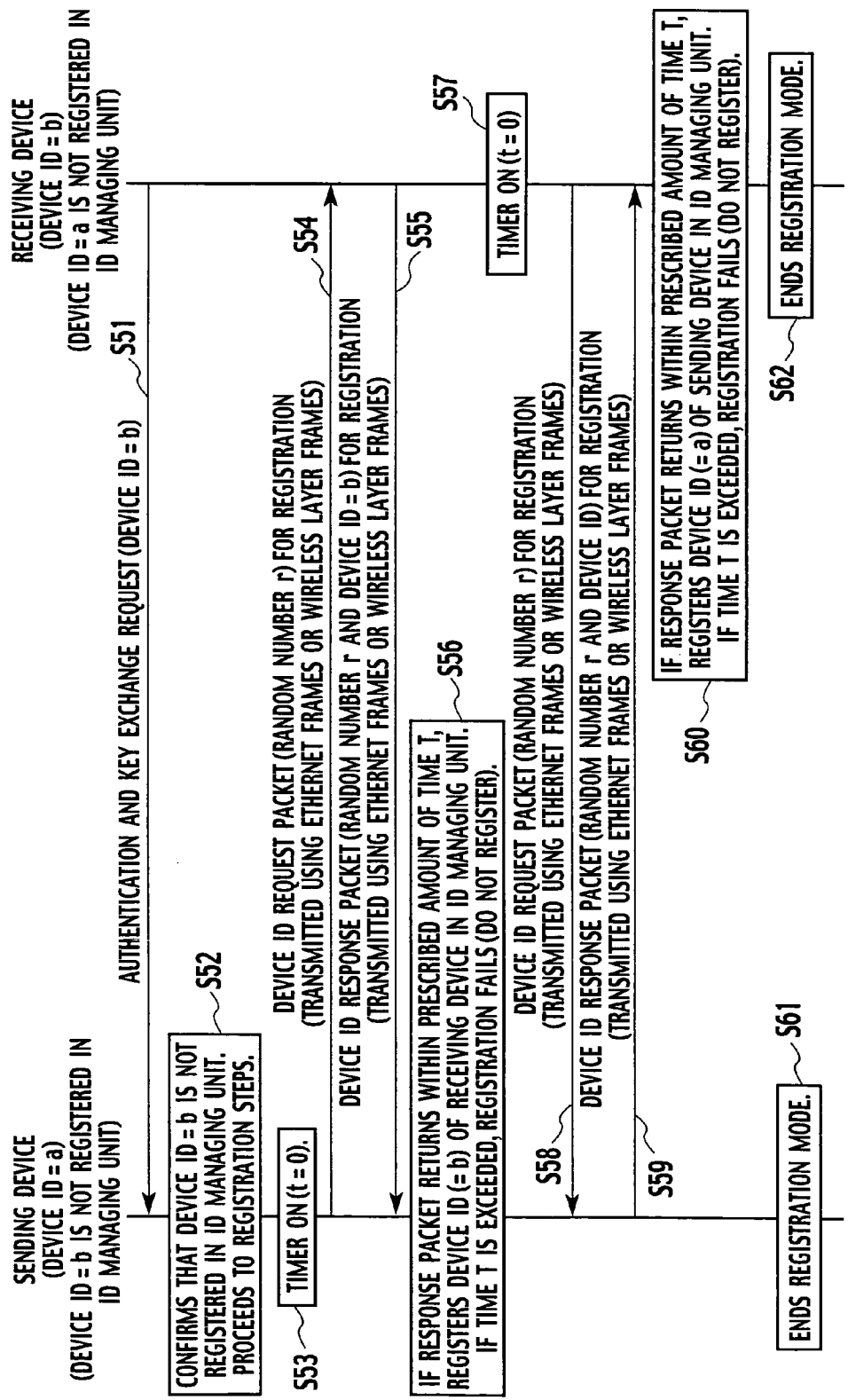
FIG. 8 is a sequence diagram showing the processing steps for transmitting AV data in the second embodiment.

FIG. 8 is a sequence diagram showing the processing steps for transmitting AV data in the second embodiment. First, the receiving device 3 issues a request for authentication and key exchange to the sending device 2 (step S51). The sending device 2 confirms that the receiving device 3 from which the request for authentication and key exchange was issued is not already registered in the ID managing unit (step S52), starts measuring time with the measuring unit (step S53), and sends a device ID request packet to the receiving unit 3 using Ethernet (registered trademark) frames or wireless layer frames (step S54).

The receiving device 3 responds to the packet by sending a device ID response packet to the sending device 2 using Ethernet (registered trademark) frames or wireless layer frames (step S55).

Next, if the amount of time from when the sending device 2 sent the device ID request packet until it received the device ID response packet is within a prescribed amount of time T, the sending device 2 registers the device ID (=b) of the receiving device 3 to the ID managing unit 14. If response is not received within the prescribed amount of time T, the device ID is not registered (step S56).

Next, the receiving device 3 uses the same steps to execute registration processing with respect to the device ID of the sending device 2 (steps S57 to S60). Thereafter, the processing steps are the same as steps S21 to S32 of FIG. 6.

When either one of the devices, i.e., the sending device 2 or the receiving device 3, has already completed the device ID registration procedure, the steps S52 to S56 or the steps S57 to S60 of FIG. 8 can be omitted.

Thus, the second embodiment eliminates unnecessary requests and responses for device IDs because the device ID requests are issued after the request for authentication and key exchange. As a result, communication traffic can be reduced.

Third Embodiment

The third embodiment is different from the first and second embodiments in that it is configured such that AV data can only be transmitted between a sending device and a receiving device in which an ID sent from the same short-distance wireless device is registered.

Figure 9:
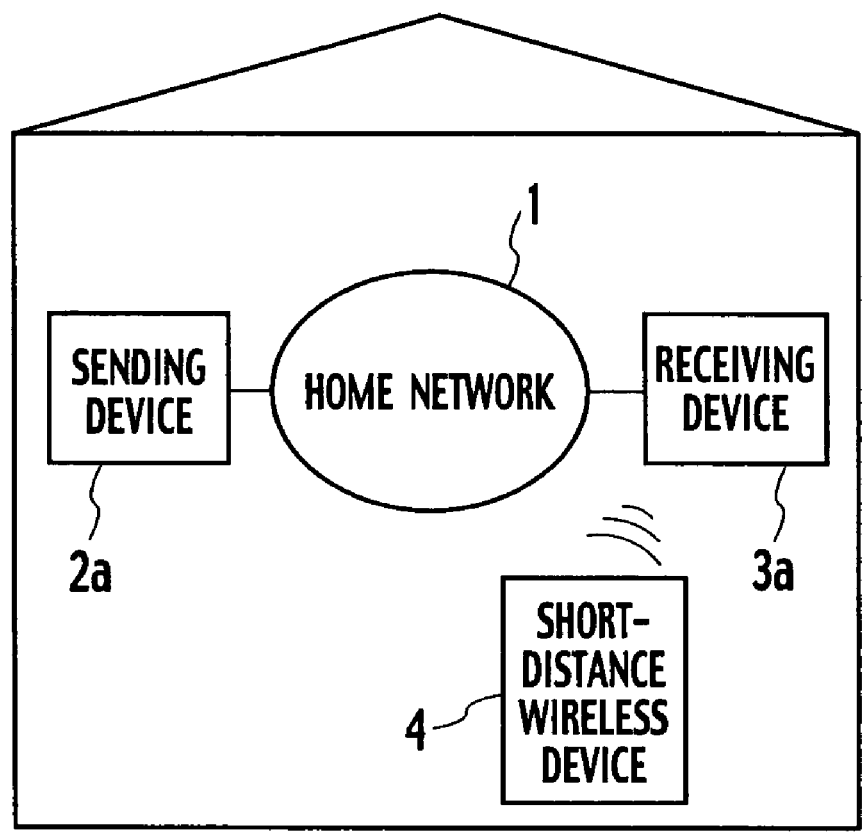
FIG. 9 is a block diagram showing an information communication system in accordance with the third embodiment of the present invention.

FIG. 9 is a block diagram showing an information communication system in accordance with the third embodiment of the present invention. In addition to the features shown in FIG. 1, the information communication system shown in FIG. 9 is provided with a short-distance wireless device 4 that includes an infrared remote controller (hereinafter called "remote control") and a wireless tag.

The sending device 2a and the receiving device 3a of this embodiment both communicate wirelessly with the short-distance wireless device 4 and register the globally unique ID (hereinafter called "short-distance ID") sent from the short-distance wireless device 4. AV data (or its copyright protection key exchange) is only allowed to be transmitted between a sending device 2a and a receiving device 3a that have this short-distance ID registered therein. More specifically, if the ID is not registered in the sending device 2a and receiving device 3a, authentication and key exchange (or exchange of content) will not succeed between the sending device 2a and receiving device 3a.

The short-distance wireless device 4 holds the short-distance ID and sends the ID to both the sending device 2a and the receiving device 3a using short-distance wireless communication only. The "short-distance" mentioned here is, for example, the range (e.g., several meters) that can be reached by the infrared rays in the case of an infrared device or the range (e.g., several centimeters) that can be reached by the radio waves in the case of a wireless tag device.

Figure 10:
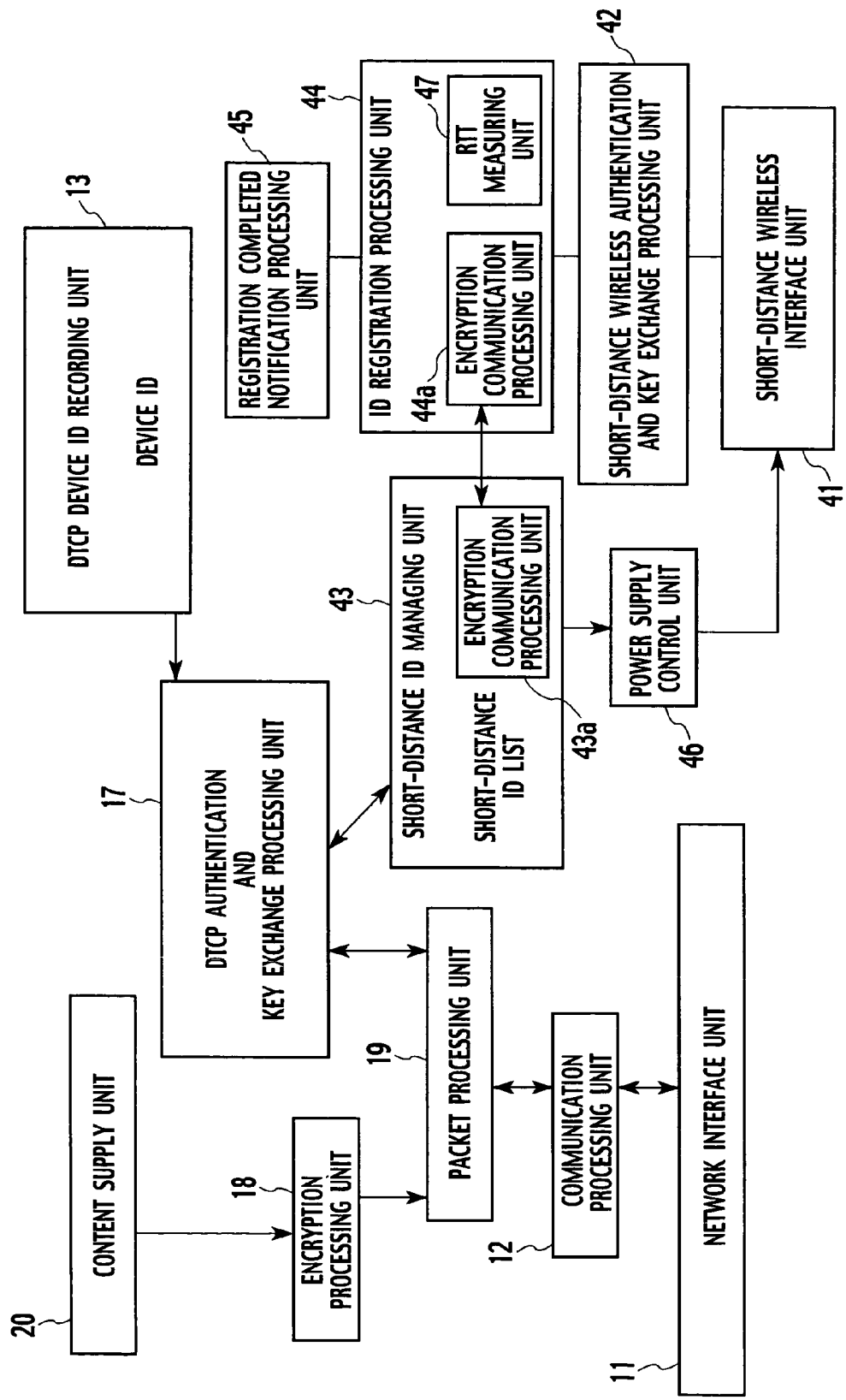
FIG. 10 is a block diagram showing an example of the sending device 2a shown in FIG. 9.

FIG. 10 is a block diagram showing an example of the sending device 2a shown in FIG. 9. Components in FIG. 10 that are the same as in FIG. 2 are indicated with identical reference symbols and only the differences will be discussed below.

Similarly to FIG. 2, the sending device 2a of FIG. 10 is provided with a network interface unit 11, a communication processing unit 12, a DTCP device ID recording unit 13, an ID managing unit 14, a DTCP authentication and key exchange processing unit 17, an encryption processing unit 18, a packet processing unit 19, and a content supplying unit 20. Additionally, the sending device 2a of FIG. 10, is provided with the following: a short-distance wireless interface unit 41 for short-distance wireless c cation; a short-distance authentication and key exchange processing unit 42 configured to execute authentication and key exchange between the sending device 2a and the short-distance wireless device 4; a short-distance ID managing unit 43 configured to register the short-distance ID acquired by means of short-distance wireless communication; an ID registration processing unit 44 configured to control the registration of the short-distance ID to the short-distance ID managing unit 43; a registration completed notification processing unit 45 configured to notify the user that the registration of a short-distance ID has been completed; and a power supply control unit 46 configured to supply a power supply voltage to the short-distance wireless interface unit 41 and peripheral units thereof only during registration of a short-distance ID.

For security reason, it is also acceptable to provide the short-distance ID managing unit 43 and the ID registration processing unit 44, respectively, with encryption communication processing units 43a, 44a configured to encrypt the short-distance ID. This arrangement eliminates the risk of the short-distance ID being illicitly acquired form the data bus between the short-distance ID managing unit 43 and the ID registration processing unit 44. More specifically, the data transfer between the ID registration processing unit 44 and the short-distance ID managing unit 43 takes place through a general-purpose data bus in a case in which all of the following conditions exist: the short-distance wireless interface unit 41, the short-distance wireless authentication and key exchange processing unit 42, and the ID registration processing unit 44 are modularized into, for example, infrared modules or wireless tag modules; the modules are connected to a PCI bus or other general-purpose data bus; and the short-distance ID managing unit 43 and the DTCP authentication and key exchange processing unit 17 operate using software located in an MPU. Consequently, if the short-distance ID is not encrypted, it can be intercepted illicitly on the general-purpose data bus and used for such purposes as to make illegal copies.

Therefore, it is preferred to provide encryption communication processing units 43a and 44a in the short-distance ID managing unit 43 and the ID registration processing unit 44, respectively, and encrypt, such as the short-distance ID before transmitting it. The encryption communication processing units 43a, 44a can be constituted with hardware or they can configured to accomplish the encryption of the IDs using software by preparing an API for encrypting with software.

It is also acceptable to provide the encryption communication processing units 43a, 44a with internal functions for measuring if the communications between the encryption communication processing units 43a, 44a are taking place within a prescribed amount of tire. This function is provided in order to check if the physical distance between the short-distance ID managing unit 43 and the ID registration processing unit 44 is within a prescribed distance (e.g., if the physical distance between the short-distance ID managing unit 43 and the ID registration processing unit 44 within the same case is within a prescribed distance or if the physical distance between the short-distance ID managing unit 43 and an externally attached part, such as a USB dongle, constituting the short-distance wireless processing unit is within a prescribed distance).

The externally attached part mentioned here includes, for example, the short-distance wireless interface unit 41, the short-distance authentication and key exchange processing unit 42, and the ID registration processing unit 44. Without this time measuring (distance measuring) function, it is feasible that someone could attack the system by arranging an externally attached part in a remote location, connecting the short-distance ID managing unit 43 and the externally attached part together through the internet or other public network (wide area network), and registering a device remotely. Said function has the effect of preventing such an attack.

It is possible that the functions related to short-distance wireless communication (e.g., the short-distance wireless interface unit 41, the short-distance authentication and key exchange processing unit 42, and the ID registration processing unit 44) will be functions that are not used except when registering a short-distance ID. Therefore, electric power can be conserved by configuring the system such that power is not supplied to these functions except when a short-distance ID is being registered. This control of the power supply is executed by the power supply control unit 46. The power supply control unit 46 detects when a user presses the short-distance ID registration button and controls the power supply accordingly.

The short-distance wireless ID is an identification number for the short-distance wireless device 4 and it is acceptable for it to be an identification number that is issued by the same licensing institution as the DTCP or DTLA (the license organization of DTCP) and assigned a value that is unique throughout the world. Similarly to the DTCP device ID, it is also acceptable for the short-distance wireless ID to be an ID embedded in a certificate (called a "device certificate") that proves the device is a properly licensed device. The device certificate includes digital signatures and the like that can be verified to confirm that the device certificate is the correct certificate.

Figure 11:
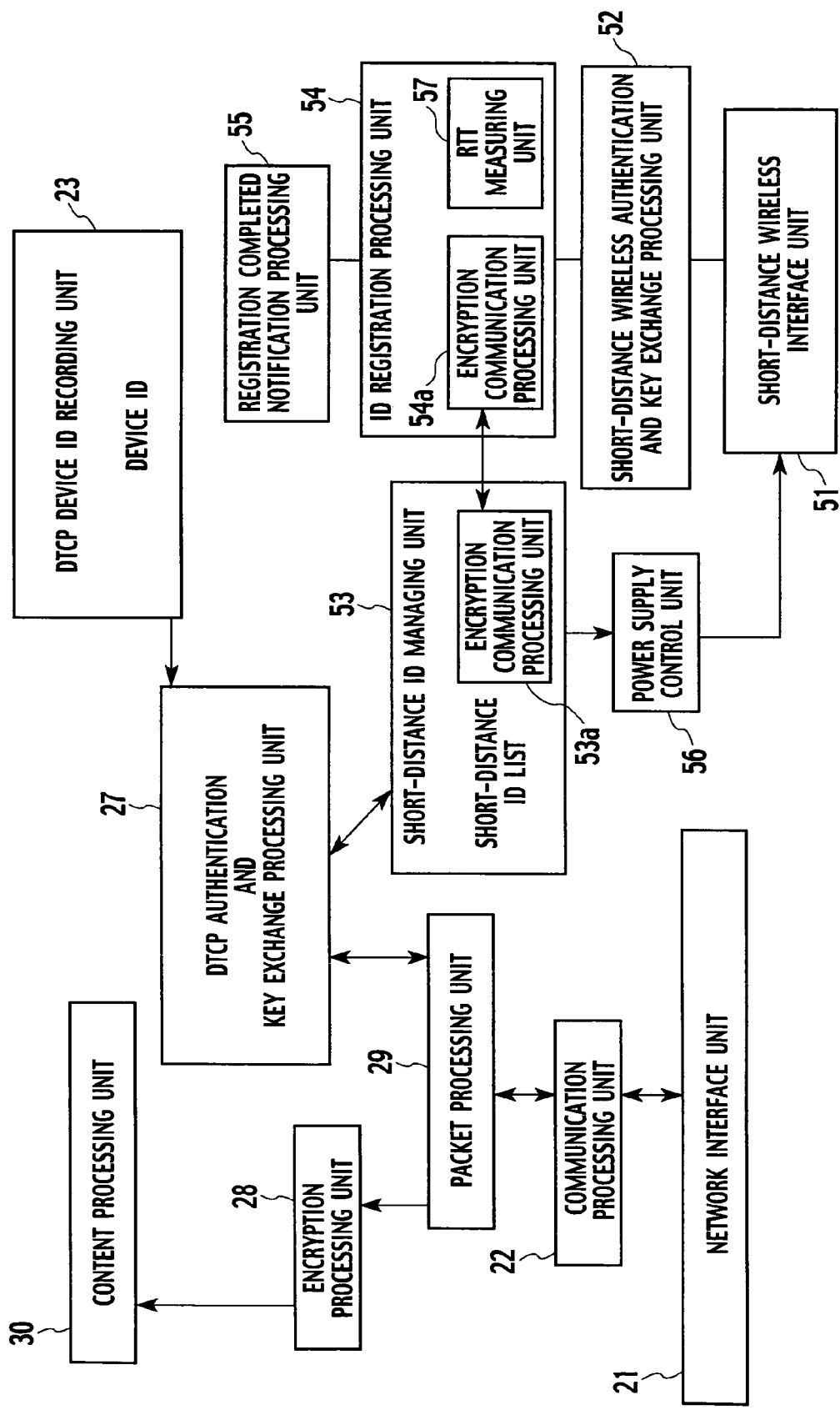

FIG. 11 is a block diagram showing an example of the receiving device 3a. Components in FIG. 11 that are the same as in FIG. 4 are indicated with identical reference symbols and only the differences will be discussed below.

Similarly to FIG. 4, the receiving device 3a of FIG. 11 is provided with a network interface unit 21, a communication processing unit 22, a DTCP device ID recording unit 23, an ID managing unit 14, a DTCP authentication and key exchange processing unit 27, an encryption processing unit 28, a packet processing unit 29, and a content supplying unit 30. Additionally, the receiving device 23a of FIG. 11, is provided with the following: a short-distance wireless interface unit 51 for short-distance wireless communication; a short-distance authentication and key exchange processing unit 52 configured to execute authentication and key exchange between the receiving device 3a and the short-distance wireless device 4; a short-distance ID managing unit 53 configured to register the short-distance ID acquired by means of short-distance wireless communication; an ID registration processing unit 54 configured to control the registration of the short-distance ID to the short-distance ID managing unit 53; a registration completed notification processing unit 55 configured to notify the user that the registration of a short-distance ID has been completed; and a power supply control unit 56 configured to operate (i.e., turn on the power to) the short-distance wireless interface unit and peripheral units thereof only during registration of a short-distance ID.

FIG. 12 shows the data structure of the short-distance ID managing units 43, 53 inside the sending device 2a and receiving device 3a. The values of the short-distance IDs are registered in the short-distance ID managing unit 43, 53 as mandatory items. Other values, such as the RTT (round trip time), the DTCP device ID, and the date and time of registration corresponding to each short-distance ID are recorded as optional items.

Figure 13:
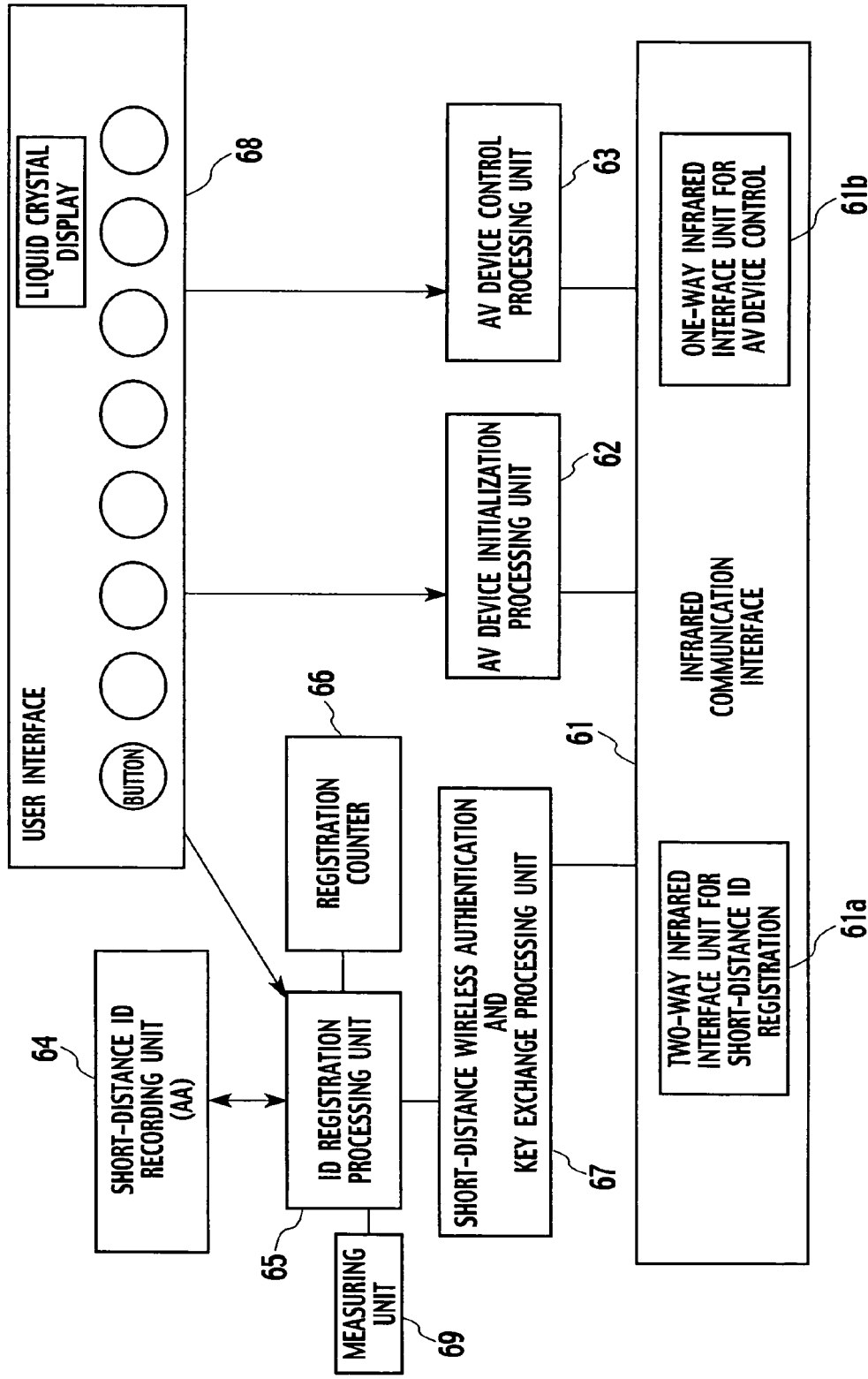
FIG. 13 is a block diagram showing an example of the internal features of the short-distance wireless device 4 when the short-distance wireless device 4 is an infrared remote control device.

FIG. 13 is a block diagram showing an example of the internal features of the short-distance wireless device 4 when the short-distance wireless device 4 is an infrared remote control device. The infrared remote control device of FIG. 13 is provided with the following: an infrared communication interface unit 61; an AV device initialization processing unit 62 for initializing the AV device; an AV device control processing unit 63 for controlling the AV device; a short-distance ID recording unit 64 configured to record the short-distance ID of the infrared device; an ID registration processing unit 65 configured to control registration of the ID to the short-distance ID recording unit 64; a registration counter 66 configured to measure the number of times recording of the short-distance ID to the short-distance ID recording unit 64 takes place; short-distance wireless authentication and key exchange processing unit 67 configured to execute authentication and key exchange between the short-distance wireless device 4 and the sending device 2a, or, between the short-distance wireless device 4 and the receiving device 3a; and a user interface unit 68.

It is acceptable for the infrared communication interface unit 61 to be provided with a two-way infrared interface unit for short-distance ID registration 61a and a one-way infrared interface unit for AV device control. While the infrared remote control interface for controlling an AV device is generally a one-way interface, the infrared interface for registering the short-distance ID of this embodiment is a two-way interface, as described later. In order to accomplish these two functions, it is necessary to provide the infrared communication interface unit 61 with two infrared interfaces 61a, 61b. These two infrared interfaces can be constituted with two or more separate components or sealed inside one individual component. The two-way infrared interface 61a for short-distance ID registration is connected to the short-distance wireless authentication and key exchange processing unit 67 and the AV device initialization processing unit 62. Meanwhile, the one-way infrared interface 61b for AV device control is connected to the AV device control processing unit 63. It is acceptable for these two infrared interfaces 61a, 61b to use different infrared frequencies, command systems, and packet formats.

Figure 14:
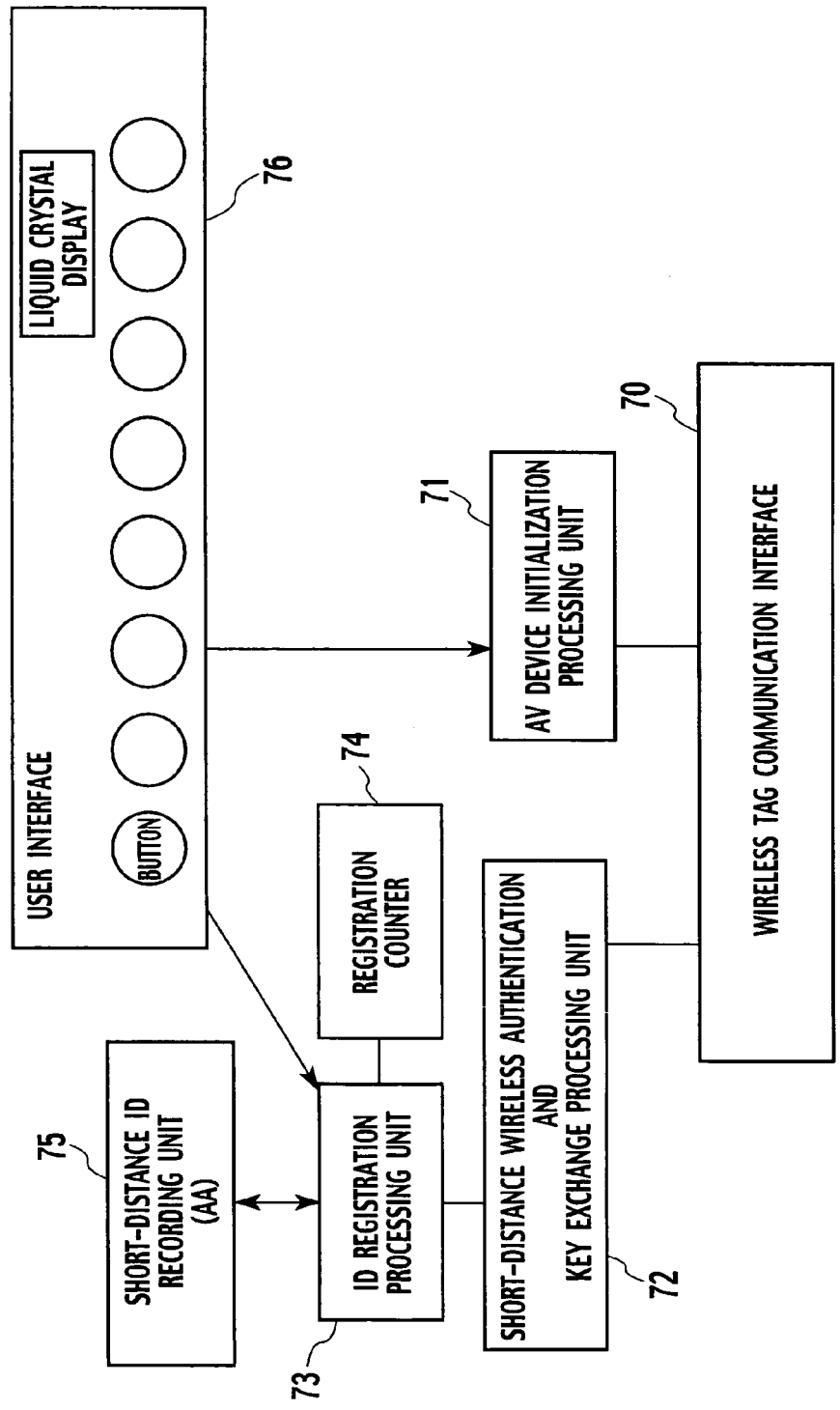
FIG. 14 is a block diagram showing an example of the internal features of the short-distance wireless device 4 when the short-distance wireless device 4 is a wireless tag device.

Meanwhile, FIG. 14 is a block diagram showing an example of the internal features of the short-distance wireless device 4 when the short-distance wireless device 4 is a wireless tag device. The wireless tag device of FIG. 14 is provided with the following: a wireless tag communication interface unit 70; an AV device initialization processing unit 71; a short-distance wireless authentication and key exchange processing unit 72; an ID registration processing unit 73; a registration counter 74; a short-distance ID recording unit 75; and a user interface unit 76.

The wireless tag device does not require a battery, and is therefore economical, because it sends its wireless signal using electric power generated from received radio waves. Although omitted in FIG. 14, a capacitor for storing electric power generated from received radio waves is provided inside the wireless tag device.

Figure 15:
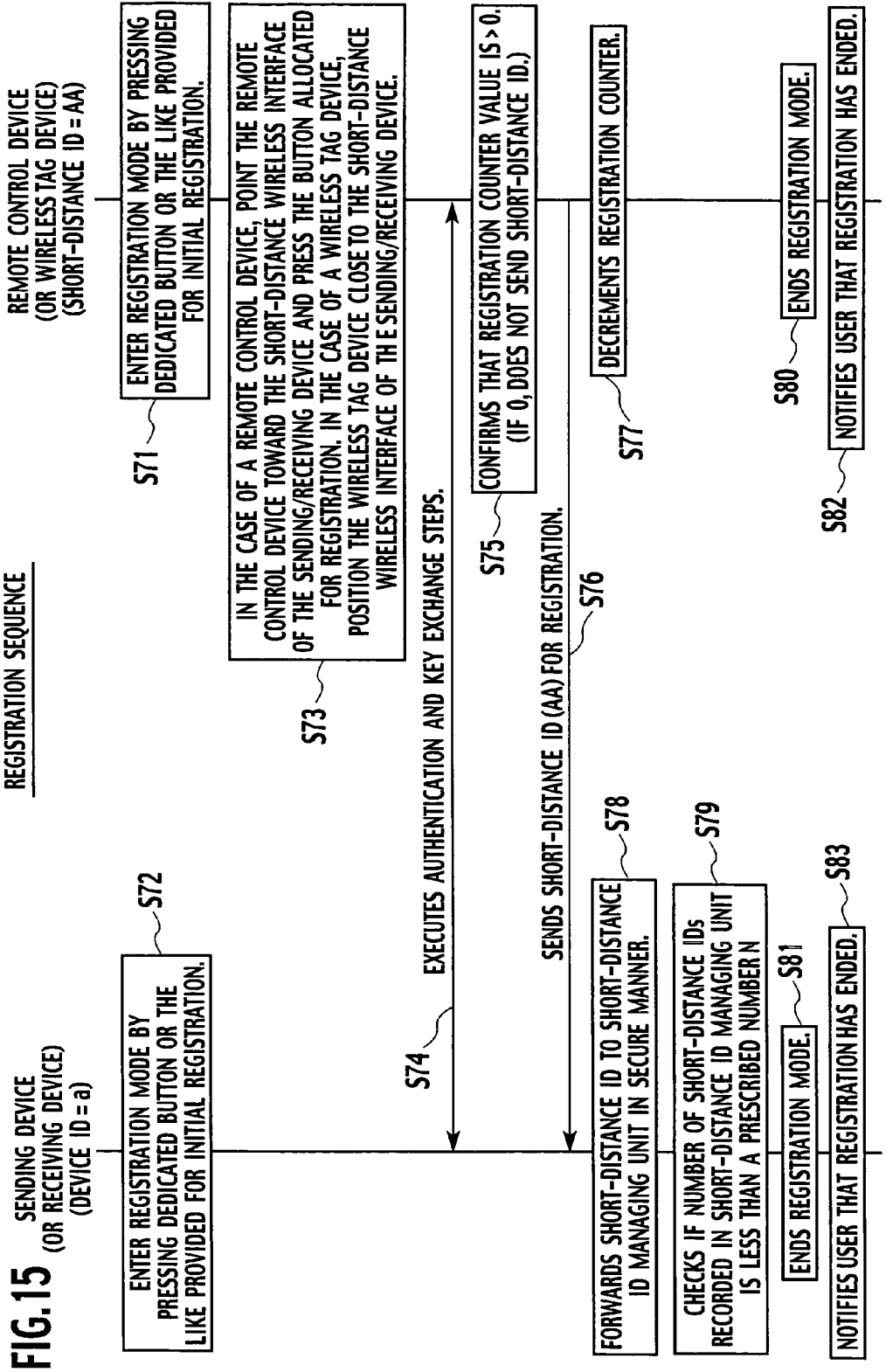

FIG. 15 is a sequence diagram showing the processing steps for registering a short-distance ID to the sending device 2a and the receiving device 3a. The processing steps for registering a short-distance ID will now be described based on FIG. 15. In order to send the short-distance ID from the short-distance wireless device 4 to the sending device 2a (or the receiving device 3a), the user depresses the button 68a of the short-distance wireless device 4 shown in FIG. 13 to put the short-distance wireless device 4 into registration mode (step S71). Then the user depresses the button of the sending device (or receiving device 3a) to which the short-distance ID is to be sent and points the short-distance wireless device 4 toward the sending device 2a (or receiving device 3a). This procedure puts the sending device 2a (or receiving device 3a) into registration mode (step S72).

It is acceptable for the sending device 2a (or receiving device 3a) to be configured such that, when the device enters registration mode, the power supply control unit 46 (or 56) delivers electric power to the short-distance wireless interface unit 41 (or 51) and the peripheral units thereof.

Thus, with this embodiment, the possibility of sending AV data over the internet or the like from a sending device 2a to a receiving device 3a in a distant location is eliminated because it is necessary for the user to depress buttons on both the sending device 2a and the receiving device 3a and then register the short-distance ID using the same short-distance wireless device 4.

Next, the user points the short-distance wireless device 4 at the sending device 2a (or receiving device 3a) or brings the short-distance wireless device 4 close to the sending device 2a (or receiving device 3a) and depresses the short-distance ID registration button (step S73). This action causes authentication and key exchange to take place between the short-distance wireless device 4 and the sending device 2a (or receiving device 3a) and each device confirms that the other is a device that has been recognized by a proper licensing institution (step S74). If necessary, public keys or other keys are exchanged. The key exchange procedure is discussed later.

Next, the short-distance wireless device 4 determines if the value of the registration counter, which measures the number of times the short-distance ID has been sent to a sending device 2a (or receiving device 3a) and registered, is larger than zero (step S75). If the value of the registration counter is larger than zero, the number of previous registrations is smaller than a prescribed number and the short-distance ID is sent to the sending device 2a (or receiving device 3a) (step S76). If the value of the registration counter is zero, the prescribed number of registrations has already been performed and transmission of the short-distance ID is stopped.

It is acceptable that the short-distance ID is sent from the same wireless device 4 to the same sending device 2a or receiving device 3a) for more than two times.

After the short-distance wireless device 4 sends the short-distance ID to the sending device 2a (or receiving device 3a), it decrements the registration counter by 1 (step S77).

The sending device 2a (or receiving device 3a) receives the short-distance ID and transmits the short-distance ID to the short-distance ID managing unit 43, 53 (step S78). As described previously, in order to prevent unlawful acquisition of the short-distance ID during transmission, the short-distance ID can be, for example, encrypted or provided with a signature so that it can be determined if the short-distance ID has been altered. It is also acceptable to measure if the transmission to the short-distance ID managing unit 43, 53 is accomplished within a prescribed amount of time.

Next, it is determined if the number of short-distance IDs registered in the short-distance ID managing unit 43, 53 is below a prescribed number N (step S79). If the number of short-distance IDs is below the prescribed number, the short-distance ID is registered. If the number of short-distance IDs is already the prescribed number N, it is acceptable to register the new short-distance ID after deleting the short-distance ID that was registered the longest ago or another short-distance ID as described previously.

After the completing the steps just described, registration mode ends for the short-distance wireless device 4 and the sending device 2a (or receiving device 3a) and the user is notified that registration mode has ended by a beep sound or an indication presented on a display (steps S80 to S83).

The sending device 2a and the receiving device 3a register the short-distance ID in their respective short-distance ID managing units 43, 53. A predetermined number N of IDs can be registered in the short-distance ID managing units 43, 53. The value of N can be selected to be 1 or some other value, such as 2, 4, 8, or 16. Although it is feasible to configure the system such that when there is a request to register a new short-distance ID and the maxi number N of short-distance IDs has already been registered, the new short-distance ID is registered after taking such a measure as deleting the short-distance ID that was registered the longest ago, the basic idea is to deny any registrations of new IDs beyond the prescribed number N.

The registration processing of the short-distance ID managing units 43, 53 is executed separately by the sending device 2a and the receiving device 3a, respectively. In other words, the sending device 2a and the receiving device 3a each execute the short-distance ID registration using the same short-distance wireless device 4. It is preferable that it be possible to confirm that the sending device 2a and the receiving device 3a are close to each other when the registrations are performed. Otherwise, it will be possible for the short-distance ID to registered using the same short-distance wireless device 4 at different times and locations with respect to the sending device 2a and the receiving device 3a, respectively (for example, the ID could be registered to the sending device 2a in Tokyo and to the receiving device 3a in Osaka). As a result, it would be possible to accomplish remote communication between arbitrary remote locations.

Thus, it is acceptable to provide a measuring unit 69 inside the short-distance wireless device 4 as shown in FIG. 13 so that the registration tasks executed by the sending device 2a and the receiving device 3a are disallowed if they are not executed in succession and completed within several minutes.

Another option is to provide a GPS (global positioning system) inside the short-distance wireless device 4 and disallow registration of the short-distance ID when it can be estimated that the distance between the sending device 2a and the receiving device 3a is greater than a prescribed distance.

Still another option is to provide RTT measuring units 47, 57 for measuring the RTT (round trip time) in the ID registration processing units 44, 54 of the sending device 2a and the receiving device 3a as shown in FIGS. 10 and 11, use said measuring units 47, 57 to measure if the time required (RTT) for the data transaction with the remote control device or the wireless tag device is less than a prescribed amount of time, and disallow registration of the short-distance ID if the RTT is not less than the prescribed amount of time. The RTT measuring units 47, 57 are configured to, for example, send a prescribed packet to the short-distance wireless device 4 and measure the round trip time required for a response packet to come back. The distance to the short-distance wireless device 4 can be estimated based on the RTT measurement result.

Still another option is to provide measuring units in of the ID registration processing units 44, 54 of the sending device 2a and the receiving device 3a, respectively, and check if the data transaction with the remote control device or the wireless tag device is completed within a prescribed amount of time (RTT). If not, registration of the short-distance ID is disallowed.

Figure 16:
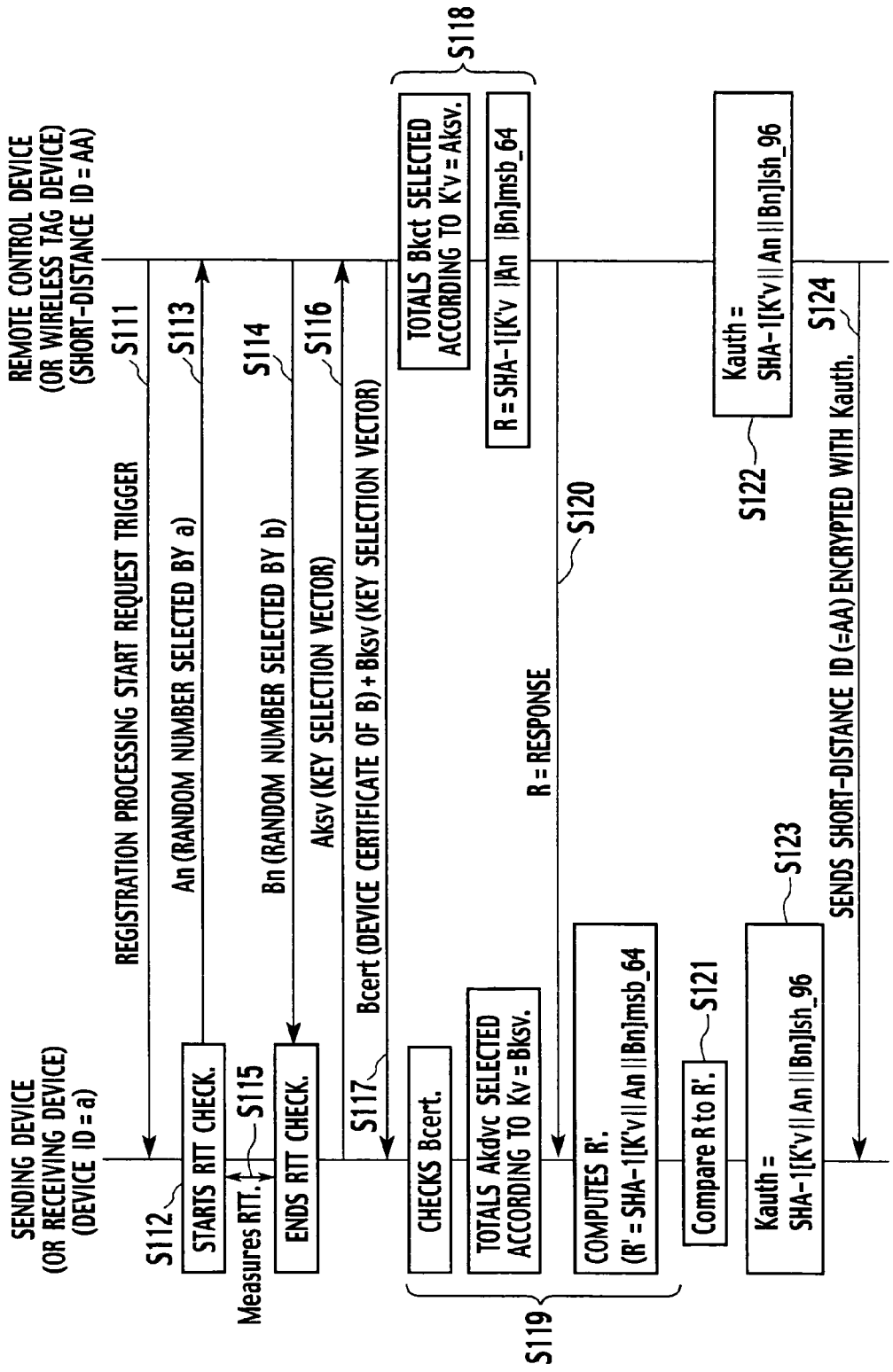
FIG. 16 is a sequence diagram of the authentication and key exchange processing and the send processing for registration of the short-distance ID.

FIG. 16 is a sequence diagram of the authentication and key exchange processing and the send processing for registration of the short-distance ID. First, the short-distance wireless device 4 sends a trigger to the sending device 2a (or receiving device 3a) requesting that registration processing start (step S111). Then, the ID registration processing unit 44 (or 54) of the sending device 2a (or receiving device 3a) starts a timer inside the RTT measuring unit 47 (or 57) (step S112) and sends a command for measuring the round trip time (RTT) to the short-distance wireless device 4 (step S113). It is acceptable for a random value An selected by the short-distance wireless device 4 to be transmitted along with the command. Upon receiving the command, the short-distance wireless device 4 immediately sends a reply to the sending device 2a (or receiving device 3a) (step S114). It is acceptable for a random value Bn selected by the sending device 2a (or remote control device (short-distance wireless device 4)) to be transmitted along with the reply.

Upon receiving the reply, the sending device 2a (or receiving device 3a) uses the timer inside the RTT measuring unit 47 (or 57) to measure the RTT (step S115). If the measured value is less than a predetermined value (e.g., several milliseconds), the distance between the short-distance wireless device 4 and the sending device 2a (or receiving device 3a) is recognized to be smaller than a prescribed distance and the subsequent authentication and key exchange processing calculating or sharing content key to encrypt the AV data is allowed. If the RTT is equal to or greater than the predetermined time value, the distance between the short-distance wireless device 4 and the sending device 2a (or receiving device 3a) is recognized to be equal to or larger than the prescribed distance (i.e., there is the possibility that the devices are arranged remotely from each other and are communicating through a public network) and the subsequent authentication and key exchange processing calculating or sharing content key to encrypt the AV data is disallowed. The measurement of the RTT is accomplished using a sequence in which encryption computations and hashing computations do not occur. Consequently, the measurement is advantageous in that an RTT value close to the true value can be measured without taking into consideration the time required for encryption and hashing computations.

Although in this embodiment the sending device 2a (or receiving device 3a) conducts the RTT measurement, it is also acceptable to reverse the direction of the sequence so that the short-distance wireless device 4 measures the RTT. It is also feasible to use a sequence in which both the sending device 2a (or receiving device 3a) and the short-distance wireless device 4 measure the RTT.

Next, the short-distance wireless device 4 and the sending device 2a (or receiving device 3a) begin the authentication and key exchange processing. In this embodiment, the processing is accomplished using extended (enhanced) restricted authentication, which has already been standardized in DTCP standards. More specifically, the sending device 2a (or receiving device 3a) sends a key selection vector Aksv to the short-distance wireless device 4 (step S116) and the short-distance wireless device 4 sends its device certificate (Bcert) and a key selection vector (Bksv) to the sending device 2a (or receiving device 3a) (step S117). Then the two devices calculate the value of R and R' by following predetermined computational operations (steps S118 and S119).

In the computations, SHA-1 is a predetermined hash function. The value of R computed by the short-distance wireless device 4 is sent to the sending device 2a (or receiving device 3a) (step S120).

The sending device 2a (or receiving device 3a) cares the value of R' that it calculated to the value of R that was sent from the short-distance wireless device 4 (step S121). If the values match, the authentication and key exchange is deemed a success and the authentication key Kauth is computed (steps S122 and S123). Since the sending device 2a (or receiving device 3a) can hold the same authentication key value Kauth, the short distance wireless device 4 sends the short-distance ID value (AA) to the sending device 2a (or receiving device 3a) using that value Kauth as a key (step S124). Feasible methods include, for example, using the XOR of the short-distance ID and the value of Kauth and sending the result of an encryption computation that uses the value of Kauth as a key.

Since the extended restricted authentication of DTCP is provided with a mechanism to revoke a device, it is possible for the sending device 2a (or receiving device 3a) to deny (revoke) transactions from a particular short-distance wireless device 4.

See the DTCP standards listed at http://www.dtcp.com for details regarding the extended restricted authentication procedure of DTCP.

Figure 17:
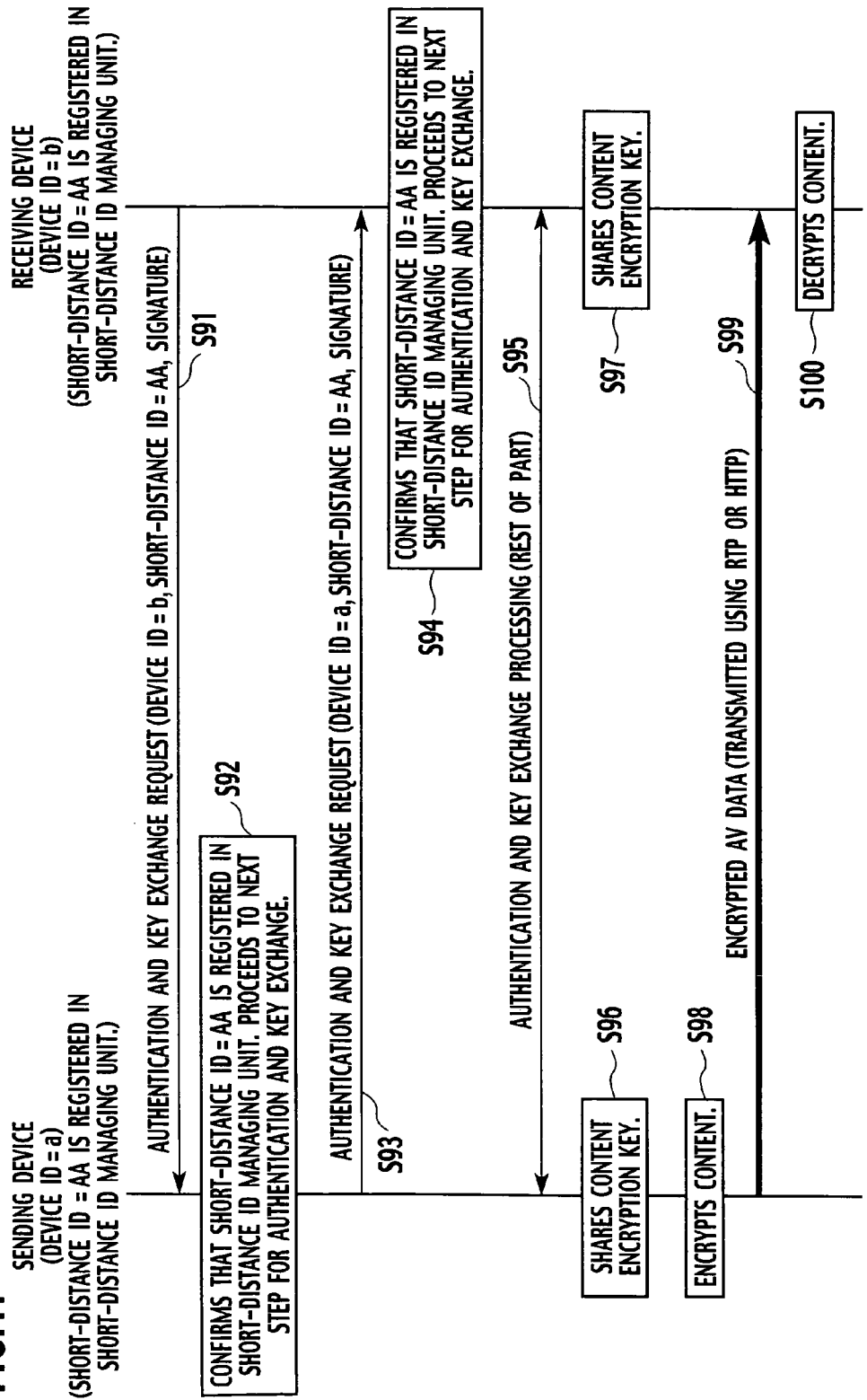

FIG. 17 is a sequence diagram showing the processing steps for transmitting AV data between the sending device 2a and the receiving device 3a. In this embodiment, it is assumed that the same short-distance ID (=AA) is registered in the short-distance ID managing units 43, 53 of both the sending device 2a (which is assumed to have device ID=a) and the receiving device 3a (which is assumed to have device ID=b), respectively.

The receiving device 3a requests the sending device 2a for authentication and key exchange by sending notification of its own device ID (=b) and the short-distance ID (=AA) (step S91).

Upon receiving the request, the sending device 2a confirms that the short-distance ID AA is registered in its short-distance ID managing unit (step S92) and requests the receiving device 3a for authentication and key exchange by sending notification of its own device ID (=a) and the short-distance ID (=AA) (step S93).

Upon receiving this request, the receiving device 3a confirms that the short-di-stance ID AA is registered in its short-distance ID managing unit (step S94), and authentication and key exchange is executed between the sending device 2a and the receiving device 3a.

If the authentication and key exchange succeeds, the sending device 2a and receiving device 3a will share a common content encryption key (steps S96 and S97). The sending device 2a uses this key to encrypt the AV data (step S98) and sends the encrypted AV data to the receiving device 3a (step S99). The receiving device 3a uses the content encryption key to decrypt the received AV data (step S100).

It is also feasible to use a method in which the short-distance ID is used as an input to the computation of the content encryption key.

Figure 18:
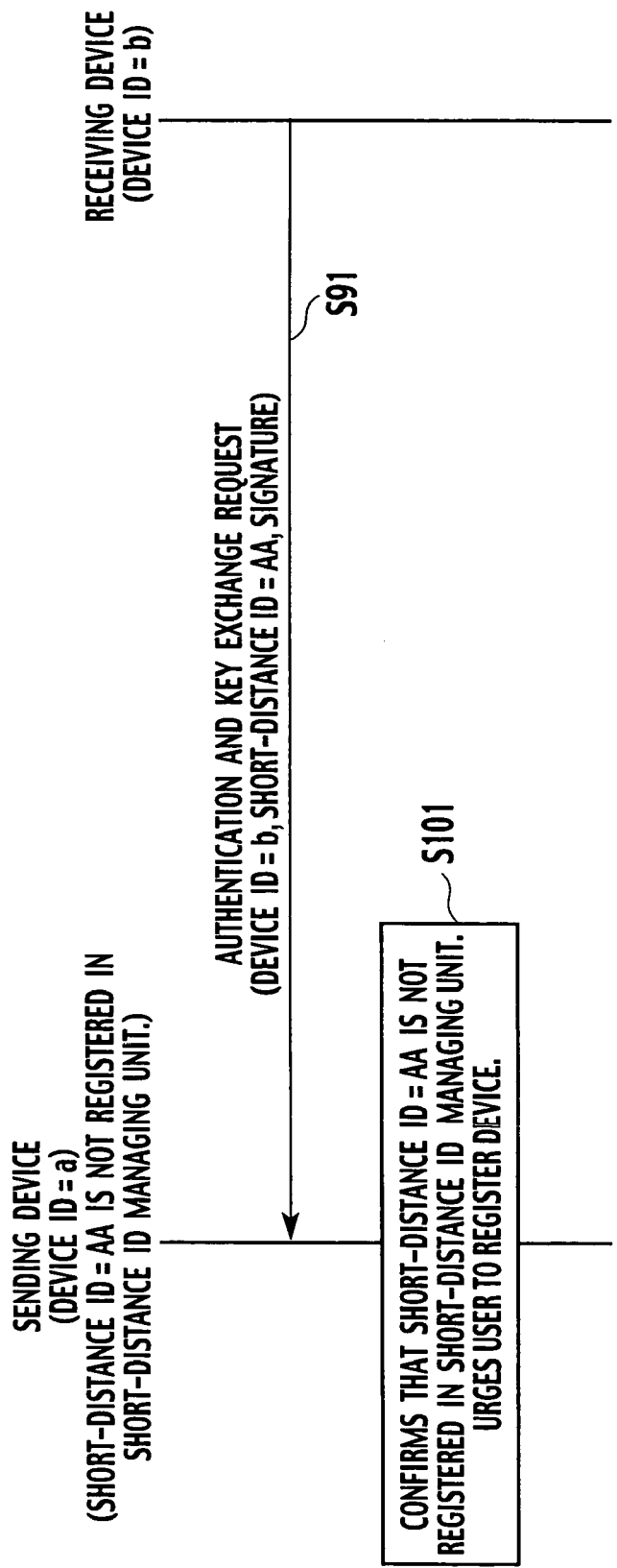

FIG. 18 is a sequence diagram showing the processing steps for a case in which the short-distance ID (=AA) sent from the receiving device 3a in the previously described step S91 is not registered in the short-distance ID managing unit 43 of the sending device 2a. The sending device 2a confirms that the short distance ID (=AA) is not registered in the short-distance ID managing unit 43 and urges the user to registered the short-distance ID using a beep sound or the like (step S101).

Figure 19:
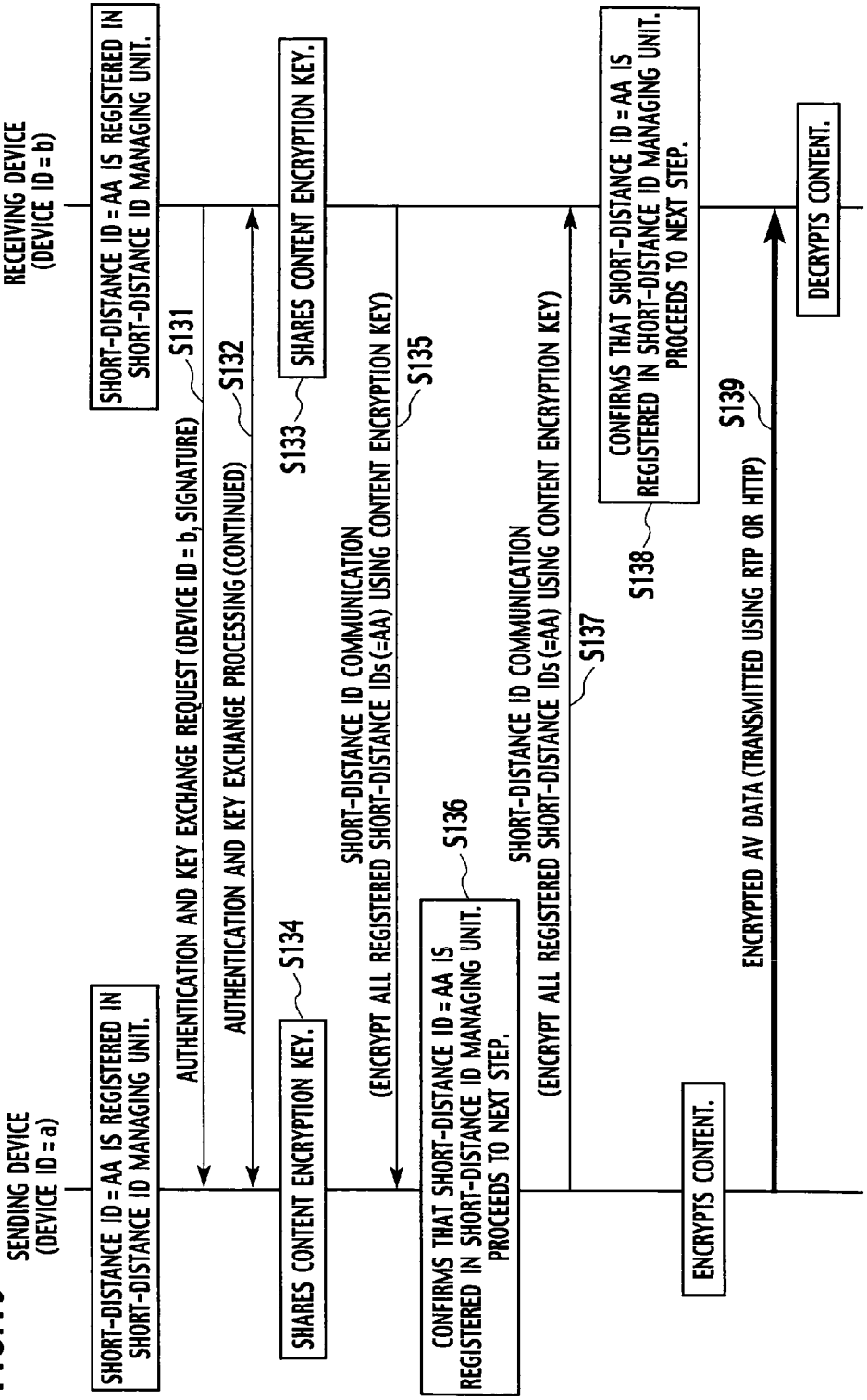

FIG. 19 is a sequence diagram showing another example of the processing steps for transmitting AV data between the sending device 2a and the receiving device 3a. In this example, the processing up to the step where the content encryption key is shared by the sending device 2a and the receiving device 3a (steps S131 to S134) is the same as the DTCP authentication and key exchange processing shown in FIG. 17. Then, one or both of the devices confirms the value of the short-distance ID. Since there are no changes to the DTCP authentication and key exchange procedure, this arrangement has the merit that the conventional commands can be used as is by merely preparing additional commands for executing the short-distance ID transactions.

In this embodiment, the short-distance ID confirmation is carried out at the beginning part of the processing AKE (authentication and key exchange) protocol. It is also acceptable such that the short-distance ID confirmation is carried out before the processing of AKE protocol, during the processing of the AKE protocol, or at the ending part of the processing AKE protocol.

Fourth Embodiment

In the third embodiment, the ID registration was accomplished using a short-distance wireless device. In the fourth embodiment, instead of a short-distance wireless device, an IC card (contact-type IC card), memory card, or other detachable storage device is used to accompli the ID registration. In this explanation, an IC card refers to, for example, a plastic card having a built-in IC and the size of a credit card or a stamp. A memory card refers to, for example, a PCMCIA memory card or such a memory card of the type represented by SD cards and memory sticks. The memory card is not limited to having a card-like shape and can be any memory device capable of being attached and detached, such as a USB key.

Figure 20:
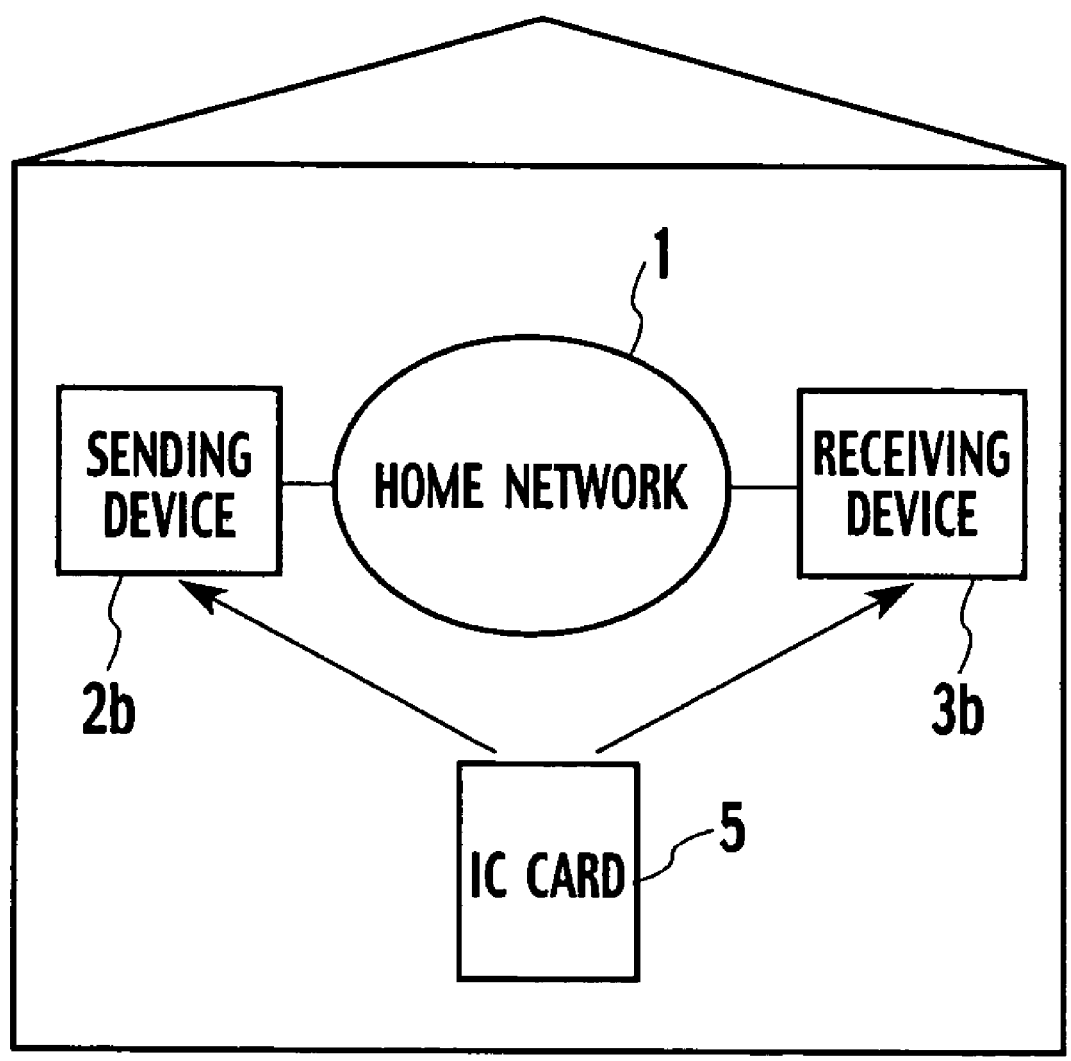
FIG. 20 is a block diagram showing an information communication system in accordance with the fourth embodiment of the present invention.
Figure 21:
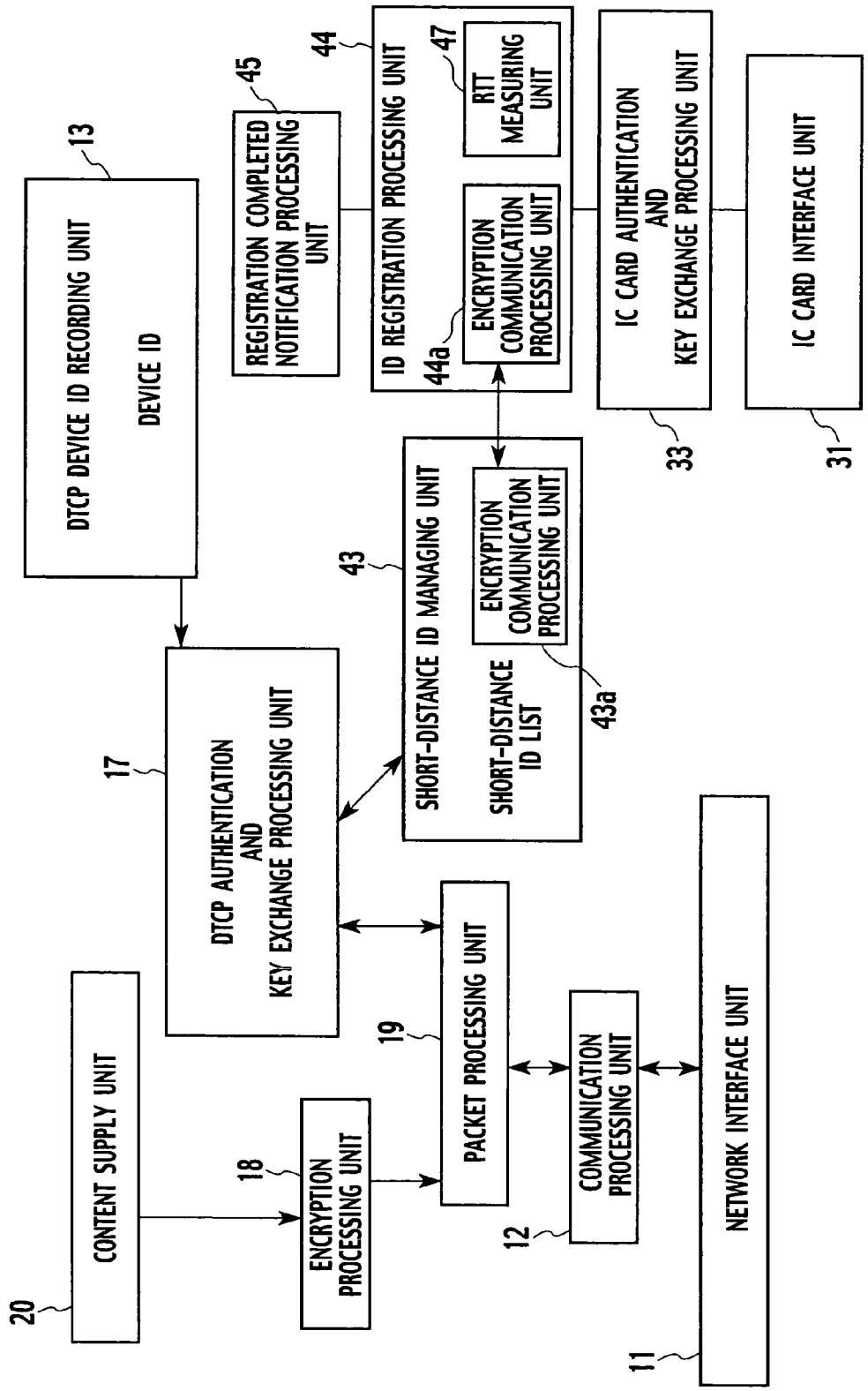
FIG. 21 is a block diagram showing an example of the internal features of the sending device 2b indicated in FIG. 20.

FIG. 20 is a block diagram showing an information communication system in accordance with the fourth embodiment of the present invention. FIG. 21 is a block diagram showing an example of the internal features of the sending device 2b indicated in FIG. 20 and FIG. 22 is a block diagram showing an example of the internal features of the receiving device 3b shown in FIG. 20. The difference with respect to the third embodiment is that instead of registering the ID using a short-distance wireless device, such as an infrared remote control or a wireless tag, the ID is registered using an IC card or a memory card (hereinafter referred to collectively as "IC card") 5.

The sending device 2b and receiving device 3b of this embodiment are different from the sending device 2a and receiving device 3a of the third embodiment in that they are each provided with an IC card interface unit 31, 32 and an IC card authentication and key exchange processing unit 33, 34 (FIGS. 21 and 22) instead of a short-distance wireless interface and a short-distance wireless authentication and key exchange processing unit.

The sending device 2b and the receiving device 3b each communicate with the IC card 5 through their respective IC card interface units 31, 32 and register the globally unique ID (short-distance ID) transmitted from the IC card 5. The feature that AV data can only be transmitted between a sending device 2b and a receiving device 3b in which the same short-distance ID has been registered is the same as the third embodiment.

Each IC card has a short-distance ID. The IC card is set into an IC card throttle (IC card interface unit) of the sending device 2b or receiving device 3b and the short-distance ID is transmitted. Since the ID transmission cannot take place unless the IC card physically exists in the interface unit, remote registration is believed to be impossible.

FIG. 23 is a block diagram showing an example of the internal features of an IC card. The IC card shown in FIG. 23 is provided with the following: an IC card interface unit 81, an AV device initialization processing unit 82 for initializing the AV device; a short-distance ID recording unit 83 configured to record the short-distance ID of the IC card; an ID registration processing unit 84 configured to control the registration of IDs to the short-distance ID recording unit 83; a registration counter 85 configured to measure the number times recording of the short-distance ID to the short-distance ID recording unit 83 takes place; a short-distance wireless authentication and key exchange processing unit 86 configured to execute authentication and key exchange between the sending device 2b and the receiving device 3b.

It is acceptable such that the short-distance ID confirmation is carried out before the processing of AKE protocol, during the processing of the AKE protocol, or at the ending part of the processing AKE protocol.

It is acceptable for the IC card shown in FIG. 23 to include other functions, such as a memory card function. In such a case, the IC card will be provided with a memory unit and functions for executing other functions.

The short-distance ID registration processing steps, registration sequence, and internal operations of the fourth embodiment are the same as in the third embodiment and the operational effects achieved are the same as with the third embodiment.

Fifth Embodiment

In the fourth embodiment, the registration of the IDs is accomplished using an ID card or a memory card. Some digital AV devices are provided with an ID card interface unit and configured such that they cannot be used as an AV device unless the ID card is inserted. One example of such a device is the B-CAS card widely used in Japan for digital broadcasting. The card is provided with a functions for receiving scrambled content from a digital broadcast and descrambling and outputting the content and a function for using an internal ID number (different from the short-distance ID) to confirm the receiver.

Since all digital broadcast devices are provided with such an IC card interface unit, it would be a convenient arrangement to use the IC card interface both for the aforementioned ID card and for an IC card configured to write a short-distance ID in accordance with the embodiment of the present invention. This embodiment is contrived to realize such an arrangement.

Figure 25:
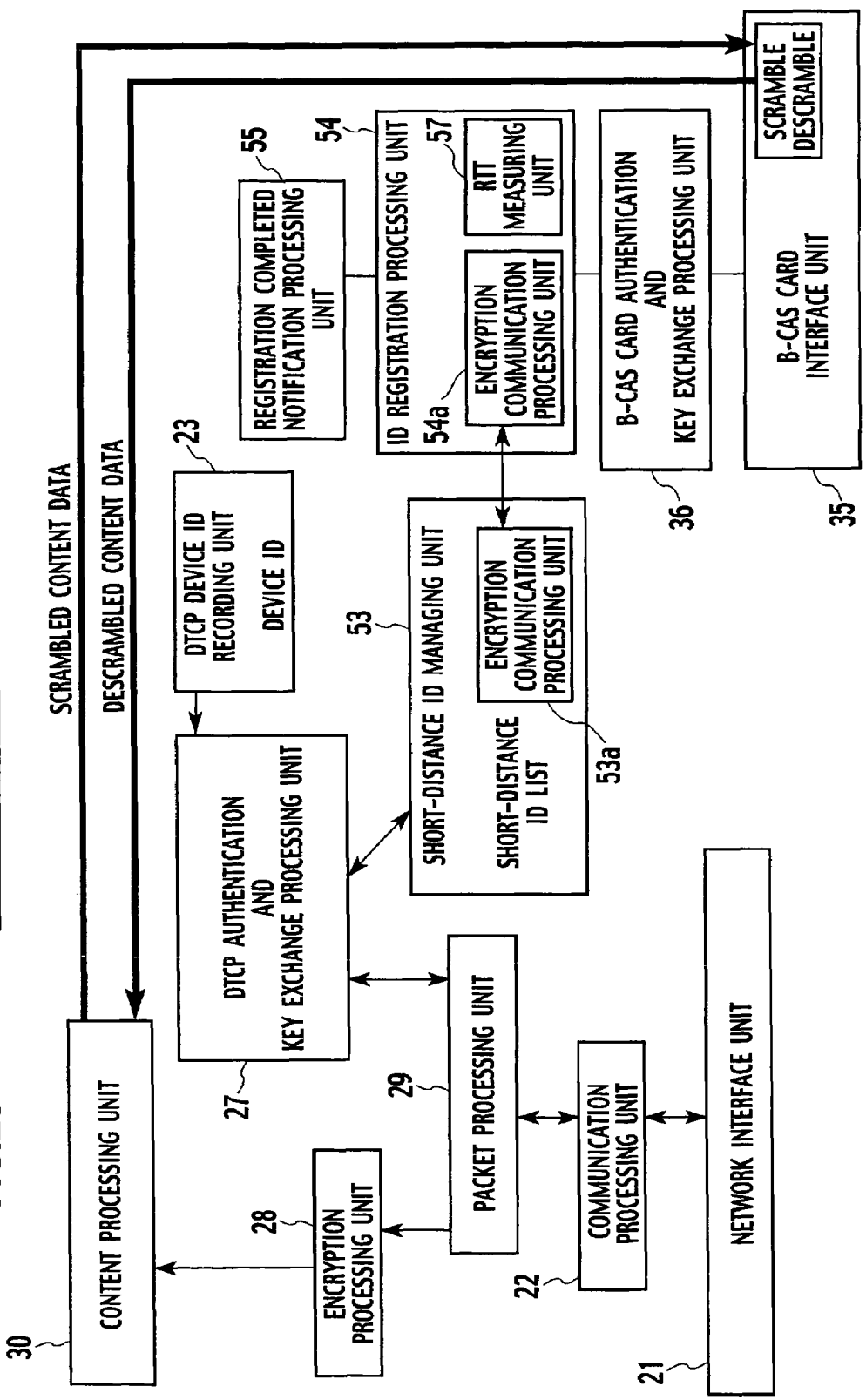
FIG. 25 is a block diagram showing an example of the internal features of the receiving device 3c indicated in FIG. 24.

FIG. 24 is a block diagram showing an information communication system in accordance with the fifth embodiment of the present invention. FIG. 25 is a block diagram showing an example of the internal features of the receiving device 3c indicated in FIG. 24. The information communication system shown in FIG. 24 is generally the same as the information communication system shown in FIG. 20 except that instead of using an ID card (or memory card), the information communication system shown in FIG. 24 uses a B-CAS card.

The information communication system shown in FIG. 24 is provided with a sending device 2c, a receiving device 3c, and a B-CAS card 6 that can be inserted into the sending device 2c and the receiving device 3c.

In this embodiment, the receiving device 3c is a device (e.g., a display) equipped with a digital broadcast receiving function.

As shown in FIG. 25, the receiving device 3c has a B-CAS card interface unit 35 and a B-CAS card authentication/key exchange processing unit 36. It is also acceptable for the sending device 2c to have a B-CAS card interface unit and a B-CAS card authentication/key exchange processing unit.

The B-CAS card interface unit 35 has the distance required for registering the short-distance ID and is provided with the characteristic functions of B-CAS cards described previously (e.g., scramble processing and receiver confirmation functions).

FIG. 26 is a block diagram showing an example of the internal features of a B-CAS card 6. The B-CAS card shown in FIG. 26 is provided with a B-CAS card interface unit 91, a B-CAS processing unit 92, an AV device initialization processing unit 93, a short-distance wireless authentication and key exchange processing unit 94, an ID registration processing unit 95, a registration counter 96, and a short-distance ID recording unit 97.

The B-CAS card 6 differs from the ID card described in the fourth embodiment in that it is provided with a B-CAS card interface 91 and a B-CAS processing unit 92 for realizing the characteristic functions of B-CAS cards (e.g., scramble processing and receiver confirmation functions).

The short-distance ID registration processing steps, registration sequence, and internal operations of the fifth embodiment are the same as in the third and fourth embodiments.

In the third to fifth embodiments, AV data can be sent form the sending device 2 to the receiving device 3 only when the same short-distance wireless device 4 has registered the short-distance ID to both the sending device 2 and the receiving device 3. Thus, an arrangement can be achieved in which AV data is allowed to be transmitted only to specific sending devices 2 and receiving devices 3 and the copyrights of the AV data can be reliably protected.

By restricting the number of times the short-distance ID can be registered from the short-distance wireless device 4 to the sending device 2 (or receiving device 3), the illicit acquisition of AV data by means of the illicit use of the short-distance wireless device 4 can be prevented.

Additionally, by setting the time interval during which the short-distance ID must be registered to the sending device 2 and the receiving device 3 to a prescribed amount of time, registration of the short-distance ID to a sending device 2 or receiving device 3 positioned in a remote location can be prevented.

Since the short-distance ID cannot be registered unless the user is close to the sending device 2 (or receiving device 3) and performs such tasks as operating a button when sending the short-distance ID from the short-distance wireless device 4 to the sending device 2 (or receiving device 3), an arrangement can be achieved in which the short-distance ID can be registered only to sending devices (or receiving devices 3) that are close to the user.

Although all of the previously described embodiments concern the transmission of AV data that requires copyright protection, the present invention can also be applied to the transmission of various other types of content (electronic data) that require copyright protection.

The internal features of the sending devices 2, 2a, 2b, 2c and receiving devices 3, 3a, 3b, 3c described in FIG. 2 and other figures are merely examples. It is also accepted for the previously described sending devices to be provided with the functions of a receiving device and/or for the receiving device to be provided with the functions of a sending device.

A transmission control program in accordance with the embodiment of the present invention is a computer program created to achieve the previously described processing and stored in a memory device provided in an information communication device or an information communication system. A processing unit provided in the information communication device or information communication system can read the computer program from the memory device and execute it to accomplish the previously described information communication processing.

As described in detail heretofore, an information communication device in accordance with the present invention does not register the device identification information of another communication device unless the other communication device is connected to a network having a limited range. Consequently, it is possible to limit the transmission destinations to which electronic data can be sent and to provide reliable copyright protection for the electronic data.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An information communication device for transmitting electronic data encrypted for purpose of copyright protection to another information communication device through a network, the device comprising:
    an identification information managing unit configured to hold device identification information identifying other information communication devices acquired through the network;
    an ID registration processing unit configured to register the device identification information of the other information communication device when the other information communication device satisfies a predetermined distance condition or when common identification information that is held by both information communication devices is received from a portable device;
    an authentication and key exchange processing unit configured to, for purpose of copyright protection, complete an authentication and key exchange process (AKE process) only when the device identification information of the other information communication device is registered in the identification information managing unit, and
    a measuring unit configured to measure if the other information communication device satisfies a predetermined distance condition,
    wherein the ID registration processing unit is configured to register the device identification information of the other information communication device when the measurement result of the measuring unit indicates that the other information communication device satisfies the predetermined distance condition.

2. The information communication device as claimed in claim 1,
    wherein the measuring unit is configured to determine if the time duration from when a request for sending information is sent to another information communication device until when the information is received from the other information communication device is within a predetermined amount of time; and
    the ID registration processing unit is configured to register the device identification information of another information communication device when the measuring unit determines that said time duration is within the predetermined amount of time.

3. The information communication device as claimed in claim 1,
    wherein the ID registration processing unit is configured to issue a registration request to another information communication device and register the device identification information of the other information communication device to the identification information managing unit when the other information communication device is recognized to be connected to a network having a prescribed limited range.

4. The information communication device as claimed in claim 3, further comprising an interface unit connected to a local network,
    wherein the ID registration processing unit is configured to register the device identification information of the other information communication device to the identification information managing unit when the other information communication device is connected directly to the local network.

5. The information communication device as claimed in claim 3, wherein the ID registration processing unit is configured such that, when the number of device identification information entries registered in the identification information managing unit reaches a predetermined upper limit, further registration of device identification information is denied or a new device identification information entry is registered after deleting the device identification information that was registered the longest ago and/or the device identification information of the registered information communication device with which communication has not been conducted for the longest period of time.

6. The information communication device as claimed in claim 3, further comprising an authentication and key exchange request receiving unit configured to receive authentication and key exchange requests from other information communication devices,
    wherein the ID registration processing unit is configured to register the device identification information of another information communication device to the identification information managing unit after the authentication and key exchange request receiving unit has received a request for authentication and key exchange.

7. The information communication device as claimed in claim 3, wherein when the device identification information of another information communication device is registered to the identification information managing unit, the communication, for AKE process and/or round trip time (RTT) measuring process, with the other information communication device is accomplished using data link layer frames or physical layer frames.

8. The information communication device as claimed in claim 7, the authentication and key exchange executed by the authentication and key exchange processing unit is accomplished using IP (internet protocol) packets.

9. An information communication system for transmitting electronic data encrypted for purpose of copyright protection to another information communication device through a network, the system comprising:
    a sending device; and
    a receiving device configured to receive electronic data encrypted for the purpose of copyright protection and sent from the sending device, wherein at least one of the sending device and the receiving device comprises:
an identification information managing unit configured to hold device identification information of other device acquired through the network;
an ID registration processing unit configured to register the device identification information of another device when the other device is recognized to be connected to a network having a prescribed limited range;
an authentication and key exchange processing unit configured to complete AKE process only when the device identification information of the other information communication device is registered in the identification information managing unit; and
a measuring unit configured to measure if the other information communication device satisfies a predetermined distance condition,
wherein the ID registration processing unit is configured to register the device identification information of the other information communication device when the measurement result of the measuring unit indicates that the other information communication device satisfies the predetermined distance condition.

10. An information communication device for transmitting electronic data encrypted for the purpose of copyright protection to another information communication device through a network, the information communication device comprising:
a first interface unit that is connected to the network;
a second interface unit configured to receive unique identification information sent from an identification information sending device that is capable of communicating with the information communication device;
an identification information managing unit configured to hold said unique identification information after it is received;
an identification information registration processing unit configured to register said unique identification information to the identification information managing unit and determine if the unique identification information is registered in the other information communication device;
a first authentication and key exchange processing unit configured to complete authentication of and key exchange with another information communication device for the purpose of copyright protection when it is determined that the unique identification information is registered in the other information communication device;
a second authentication and key exchange processing unit configured to execute authentication and key exchange with respect to the identification information sending device through the second interface unit; and
a measuring unit configured to measure the round trip time between sending a packet to the identification information sending device and receiving a corresponding response packet from the identification information sending device,
wherein the identification information registration processing unit configured to execute registration processing with respect to the identification information sending device when the second authentication and key exchange processing unit has successfully completed its authentication and key exchange with respect to the identification information sending device,
wherein the second authentication and key exchange processing unit are configured to complete authentication and exchange processing when the round trip time measured by the measuring device is less than a prescribed amount of time.

11. The information communication device as claimed in claim 10, wherein the second interface unit receives electronic data transmitted through the second interface unit include encrypted data.

12. The information communication device as claimed in claim 10, further comprising:
a registration start directive issuing unit configured to issue a directive for starting registration of the unique identification information,
the identification information registration processing unit being configured to execute registration processing when the directive has been issued from registration start directive issuing unit.

13. The information communication device as claimed in claim 10, further comprising a power supply control unit configured to deliver power supply voltage to the second interface unit when the identification information registration processing unit is executing registration processing.

14. The information communication device as claimed in claim 10, wherein the identification information registration processing unit starts registration processing after the measuring unit has completed measuring the round trip time.

15. The information communication device as claimed in claim 10, further comprising a registration notifying unit configured to notify a user that the identification information registration processing unit has registered the unique identification information.

16. The information communication device as claimed in claim 10, wherein the identification information registration processing unit further comprises an encryption communication processing unit configured to encrypt the unique identification information received from the second interface unit to register the encrypted unique identification information; and
wherein the identification information managing unit further comprises a decryption communication processing unit configured to decrypt the encrypted unique identification information sent from the encryption communication processing unit.

17. The information communication device as claimed in claim 10, wherein the unique identification information is unique to each identification information sending device.

18. The information communication device as claimed in claim 10, wherein the identification information registration processing unit limits the number of different unique identification information entries that can be registered to a predetermined number.

19. A data transmission system, comprising:
a sending device connected to a network;
a receiving device configured to receive electronic data sent from the sending device through the network, the electronic data having been encrypted for the purpose of copyright protection;
wherein at least one of the sending device and the receiving device comprises:
a communication unit configured to communicate with an identification information sending device through an interface that is separate from the network and receive unique identification information sent from the identification information sending device;
an identification information registering unit configured to register the received unique identification information;

an identification information registration determining unit configured to determine if the unique identification information is registered in other communication device;

an authentication and key exchange processing unit configured to complete authentication of and key exchange with the identification information sending device for purpose of copyright protection only when it is determined that the unique identification information is registered in the other communication device; and a measuring unit configured to measure if the identification information sending device satisfies a predetermined distance condition, wherein the identification information registering unit is configured to register the device identification information of the other information communication device when the measurement result of the measuring unit indicates that the identification information sending device satisfies the predetermined distance condition.

20. The system of claim 19, further comprising:

the identification information sending device comprising an identification information holding unit configured to hold unique identification information that is required in order for the first and second information communication devices to transmit the electronic data which are required for copyright protection to complete authentication and key exchange process (AKE process); and a communication unit configured to send the unique identification information to the first and second communication devices.

21. The information communication device as claimed in claim 20, wherein the identification information holding unit limits the number of identification information entries that can be held to a prescribed number.

22. The information communication device as claimed in claim 20, wherein the communication unit is configured to perform wireless communication between the first and second communication devices using infrared rays.

23. The information communication device as claimed in claim 22, further comprising:

a one-way infrared communication unit configured to perform one-way infrared communication, wherein the aforementioned communication unit is a two-way infrared communication unit.

24. The information communication device as claimed in claim 20, wherein the communication unit is configured to perform wireless communication between the first and second communication devices using electric power generated from received radio waves.

25. The information communication device as claimed in claim 22, wherein the communication device is configured to perform communication using a detachable memory device.

* * * * *

UNITED STATES PATENT AND TRADEMARK OFFICE
CERTIFICATE OF CORRECTION

PATENT NO. : 7,529,935 B2
APPLICATION NO. : 10/876705
DATED : May 5, 2009
INVENTOR(S) : Saito et al.

It is certified that error appears in the above-identified patent and that said Letters Patent is hereby corrected as shown below:

On the title page, Item (75), the Inventors' information is incorrect. Item (75) should read:

-- (75) Inventors: Takeshi Saito, Meguro-ku (JP); Hiroshi Isozaki, Kawasaki (JP); Tatsuyuki Matsushita, Kawasaki (JP); Taku Kato, Fuchuu (JP); Toru Kambayashi, Chigasaki (JP) --

Signed and Sealed this

Seventh Day of July, 2009

JOHN DOLL
*Acting Director of the United States Patent and Trademark Office*